US008601308B2

(12) United States Patent
Peters et al.

(10) Patent No.: US 8,601,308 B2
(45) Date of Patent: Dec. 3, 2013

(54) COMPUTER ARCHITECTURES USING SHARED STORAGE

(75) Inventors: Marc A. Peters, Garden Grove, CA (US); Dennis L. Kuehn, Long Beach, CA (US); David D. Bettger, Redondo Beach, CA (US); Kevin A. Stone, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 13/432,933

(22) Filed: Mar. 28, 2012

(65) Prior Publication Data
US 2012/0185652 A1    Jul. 19, 2012

Related U.S. Application Data

(63) Continuation of application No. 12/750,608, filed on Mar. 30, 2010, now Pat. No. 8,171,337.

(60) Provisional application No. 61/164,717, filed on Mar. 30, 2009, provisional application No. 61/164,752, filed on Mar. 30, 2009, provisional application No. 61/171,170, filed on Apr. 21, 2009.

(51) Int. Cl.
*G06F 11/00*    (2006.01)

(52) U.S. Cl.
USPC ............. 714/4.1; 714/6.2; 711/148; 711/152; 711/164

(58) Field of Classification Search
None
See application file for complete search history.

(56) References Cited

U.S. PATENT DOCUMENTS

| 4,175,287 | A | 11/1979 | Fuhrman |
| 5,657,468 | A | 8/1997 | Stallmo et al. |
| 5,706,510 | A | 1/1998 | Burgoon |
| 5,987,506 | A * | 11/1999 | Carter et al. .................. 709/213 |
| 6,360,331 | B2 | 3/2002 | Vert et al. |
| 6,601,187 | B1 | 7/2003 | Sicola et al. |
| 6,687,832 | B1 | 2/2004 | Harada et al. |
| 6,742,094 | B2 | 5/2004 | Igari |
| 6,772,031 | B1 | 8/2004 | Strand |
| 7,020,697 | B1 | 3/2006 | Goodman et al. |
| 7,139,809 | B2 | 11/2006 | Husain et al. |
| 7,149,660 | B2 | 12/2006 | Kuehn et al. |
| 7,151,438 | B1 | 12/2006 | Hall et al. |
| 7,308,532 | B1 | 12/2007 | Wood et al. |
| 7,437,426 | B2 | 10/2008 | Joshi et al. |
| 7,457,880 | B1 * | 11/2008 | Kim .............................. 709/229 |
| 7,496,646 | B2 | 2/2009 | Casper et al. |

(Continued)

OTHER PUBLICATIONS

U.S. Appl. No. 13/432,868, Final Office Action dated Feb. 4, 2013.

(Continued)

*Primary Examiner* — Christopher McCarthy
(74) *Attorney, Agent, or Firm* — Toler Law Group, PC

(57) ABSTRACT

A method providing a persistent common view of data, services, and infrastructure functions accessible via a plurality of shared storage systems of a virtual shared storage system. The method includes applying different governance policies at two or more shared storage systems of the virtual shared storage system. The method includes transferring content from a particular shared storage system to a requesting device without using at least one of a server session, an application-to-server session, and an application session. The content corresponds to at least one of data, a service, and an infrastructure function provided via the particular shared storage system.

18 Claims, 29 Drawing Sheets

(56) References Cited

U.S. PATENT DOCUMENTS

| | | | |
|---|---|---|---|
| 7,631,179 B2 | 12/2009 | Kuehn et al. | |
| 7,734,878 B1 | 6/2010 | Sharma et al. | |
| 7,734,951 B1 | 6/2010 | Balasubramanian et al. | |
| 7,739,541 B1 | 6/2010 | Rao et al. | |
| 7,739,602 B2 | 6/2010 | Feng et al. | |
| 7,739,687 B2 * | 6/2010 | Newport | 718/104 |
| 7,788,522 B1 | 8/2010 | Abdelaziz et al. | |
| 7,797,357 B1 | 9/2010 | Nagaraj et al. | |
| 7,840,995 B2 | 11/2010 | Curran et al. | |
| 7,966,370 B1 | 6/2011 | Pegg et al. | |
| 8,095,670 B2 | 1/2012 | Brown et al. | |
| 8,171,101 B2 | 5/2012 | Gladwin et al. | |
| 8,171,337 B2 | 5/2012 | Peters et al. | |
| 2001/0008019 A1 | 7/2001 | Vert et al. | |
| 2002/0038451 A1 | 3/2002 | Tanner et al. | |
| 2002/0103783 A1 | 8/2002 | Muhlestein | |
| 2002/0104039 A1 | 8/2002 | DeRolf et al. | |
| 2003/0065760 A1 | 4/2003 | Casper et al. | |
| 2003/0120751 A1 | 6/2003 | Husain et al. | |
| 2003/0154406 A1 | 8/2003 | Honarvar et al. | |
| 2004/0010544 A1 | 1/2004 | Slater et al. | |
| 2004/0025008 A1 | 2/2004 | Kuehn et al. | |
| 2006/0064554 A1 | 3/2006 | Fridella | |
| 2006/0085750 A1 | 4/2006 | Easton et al. | |
| 2006/0143606 A1 | 6/2006 | Smith et al. | |
| 2006/0174319 A1 | 8/2006 | Kraemer et al. | |
| 2006/0230118 A1 | 10/2006 | Jwo | |
| 2007/0028300 A1 | 2/2007 | Bishop et al. | |
| 2007/0073855 A1 | 3/2007 | Joshi et al. | |
| 2007/0094416 A1 | 4/2007 | Goldstein | |
| 2007/0192706 A1 | 8/2007 | Bruce et al. | |
| 2007/0240102 A1 | 10/2007 | Bello et al. | |
| 2007/0244937 A1 | 10/2007 | Flynn, Jr. et al. | |
| 2007/0283112 A1 | 12/2007 | Fujibayashi | |
| 2008/0120380 A1 | 5/2008 | Boyd et al. | |
| 2009/0013085 A1 | 1/2009 | Liberman Ben-Ami et al. | |
| 2009/0070456 A1 | 3/2009 | Brown et al. | |
| 2009/0119767 A1 | 5/2009 | Curran et al. | |
| 2009/0143128 A1 | 6/2009 | Cautley et al. | |
| 2009/0182750 A1 | 7/2009 | Keyes et al. | |
| 2009/0193207 A1 | 7/2009 | Ogata et al. | |
| 2009/0271498 A1 | 10/2009 | Cable | |
| 2010/0011007 A1 | 1/2010 | Bettger et al. | |
| 2010/0250867 A1 | 9/2010 | Bettger et al. | |
| 2010/0257374 A1 | 10/2010 | Kuehn et al. | |
| 2012/0185653 A1 | 7/2012 | Peters et al. | |
| 2012/0185725 A1 | 7/2012 | Peters et al. | |

OTHER PUBLICATIONS

U.S. Appl. No. 12/750,616, Non-Final Office Action dated Feb. 22, 2013.

* cited by examiner

COMPUTER ARCHITECTURES USING SHARED STORAGE

CLAIM OF PRIORITY

This patent application claims priority from and is a continuation of U.S. patent application Ser. No. 12/750,608, filed on Mar. 30, 2010 and entitled "Computer Architectures Using Shared Storage", which claims priority from U.S. Provisional Patent Application No. 61/164,717, filed Mar. 30, 2009, from U.S. Provisional Patent Application No. 61/164,752, filed Mar. 30, 2009, and from U.S. Provisional Patent Application No. 61/171,170, filed Apr. 21, 2009, the contents of each of which are expressly incorporated herein by reference in their entirety.

FIELD OF THE DISCLOSURE

The present disclosure is generally related to computer architectures and methods using shared storage.

BACKGROUND

Exposing functions of legacy applications to enable the legacy applications to interact with other applications can lead to significant cost savings. Certain functions of the legacy applications can be re-defined as modular, self-contained services. The capabilities of these services may be independent of context or a state of other services. Additionally, these services may be designed to be invoked via a well-defined interface. These services may be enabled in a Service-oriented Architecture (SOA) through an Enterprise Service Bus (ESB), which connects and mediates communications and interactions between the services.

As interchange of information increases, there is an increased risk that sensitive information may be unintentionally disclosed to unintended parties. SOA architectures are generally designed to transmit all user messages across one or more networks. These SOA architectures may use sessions between users to transmit data or services over a network.

Certain ESB and SOA architectures are not secure. To address this concern, an ESB or SOA architecture may be secured by inspecting an entire data stream of communications using a high assurance data guard over an Internet Protocol (IP) network. The data guard acts as an intermediary between users of a service, performing "deep packet inspection" to examine contents of the data stream for any sensitive data and or service. For example, the data guard may receive a message via a service from a first user, inspect the contents of the message, and then either re-transmit the message to an intended receiver or block the message when the message is not authorized (e.g., blocking unauthorized distribution of sensitive information). In addition, it is difficult to secure an SOA or an Enterprise service bus (ESB) over disparate systems.

ESBs and SOAs may be limited by low bandwidth and high latency. The low bandwidth and high latency may hinder the ability of service applications to transmit data in real-time while simultaneously providing separation by security level. For example, bandwidth may be limited by a number of packets that the data guard can process; latency may be limited by a speed at which the data guard can inspect and process the data packets. Thus, a full SOA or ESB implementation may be limited in scale by the limited capabilities of the data guard.

Data transmitted during SOA sessions is transient. Thus, the data cannot be retrieved for later use or analysis. If a user is not able to receive a communication in real-time, the communication cannot later be retrieved unless a separate, parallel process records and distributes the communication.

Large-scale, distributed computing environments, such as those that may us a SOA or ESB, often accommodate heterogeneous hardware and software components, network links of varying latencies, and unpredictable hardware or software failures in the network or the computers. In large storage area network (SAN) or network attached storage (NAS) environments, hardware or software failures may result in abnormal termination of applications and corrupted data files. Duplicate hardware components may be deployed to address hardware and software failure concerns. The duplicate hardware may support continual copying of files, file systems and/or mirrored systems. Additionally, complex, expensive software may be used to manage local and remote file systems. Manual intervention may be used to re-construct files from checkpoints.

SUMMARY

Systems and methods to enable a robust, high-performance ESB over shared storage are described. In a particular embodiment, infrastructure functions of the ESB are delivered by service providers to service consumers through shared storage. In this embodiment, a storage layer assumes the role of the ESB to present data to and access data from users, programs and infrastructure functions. A data tier may include user identifications (IDs), security tier, and presentation tier of the ESB. A particular ESB system includes shared storage including data and file system metadata separated from the data. The file system metadata includes location data specifying storage location information related to the data. An infrastructure function of the ESB system is provided to enable messaging between providers and consumers through the shared storage. A particular method includes enabling communication between a consumer and a producer. An infrastructure function of an enterprise service bus (ESB) is provided through shared storage to enable messaging between the providers and the consumer.

Systems and methods to enable a Service-oriented Architecture (SOA) over shared storage are also described. In a particular embodiment, infrastructure functions of the SOA are delivered by service providers to service consumers through shared storage. Data and services may reside in a storage layer. A particular SOA system includes shared storage including data and file system metadata separated from the data. The file system metadata includes location data specifying storage location information related to the data. The shared storage provides an architecture to loosely integrate a suite of services. A particular method includes enabling communication between a consumer and a producer.

Systems and methods to enable a robust, high-performance service over shared storage (SOSS) system are also described. In a particular embodiment, services are delivered by service providers to service consumers through shared storage. A particular system includes shared storage including data and file system metadata separated from the data. The file system metadata includes location data specifying storage location information related to the data. Services are provided from service providers to service consumers through the shared storage. A particular method includes hosting services on shared storage.

Additionally, systems and methods to enable a federated metadata database are described. A particular system includes multiple instances of shared storage. Each of the instances of shared storage includes data and file system metadata separated from the data. The file system metadata includes location data specifying storage location information related to the data. A persistent common view is provided of local and remote files, file systems, and services in the shared storage. The federated metadata database may reside in the shared storage and may include user IDs, security levels and locations of data files in a local or wide area network. Thus, local systems may operate independently if a network link is down. Additionally, file systems in a networked environment may automatically synchronize when the network link is back online. The federated metadata database may ensure that data is defined consistently, that the data is re-useable and shareable, that the data is accurate and up-to-date, and that the data is secure and centrally managed.

Various embodiments are disclosed that provide performance (in terms of both bandwidth and latency) of a dedicated system and security of a high-assurance guard to protect sensitive information from inadvertent disclosure.

In a particular embodiment, a metadata registry of available infrastructure functions resides in shared storage. Access to the registry may be restricted by a security level of a user, a security level of an application or a security level of data. The infrastructure functions may be stored in a directory structure to enable publish and subscribe capability. The infrastructure functions may be asynchronous, allowing them to be added, removed or acted upon independent of time. Enabling the infrastructure functions over shared storage may reduce costs of duplicating a dedicated system for each classification of information in a multi-security level environment.

The features, functions, and advantages that have been described can be achieved independently in various embodiments or may be combined in yet other embodiments, further details of which are disclosed with reference to the following description and drawings.

DETAILED DESCRIPTION

Figure 1:
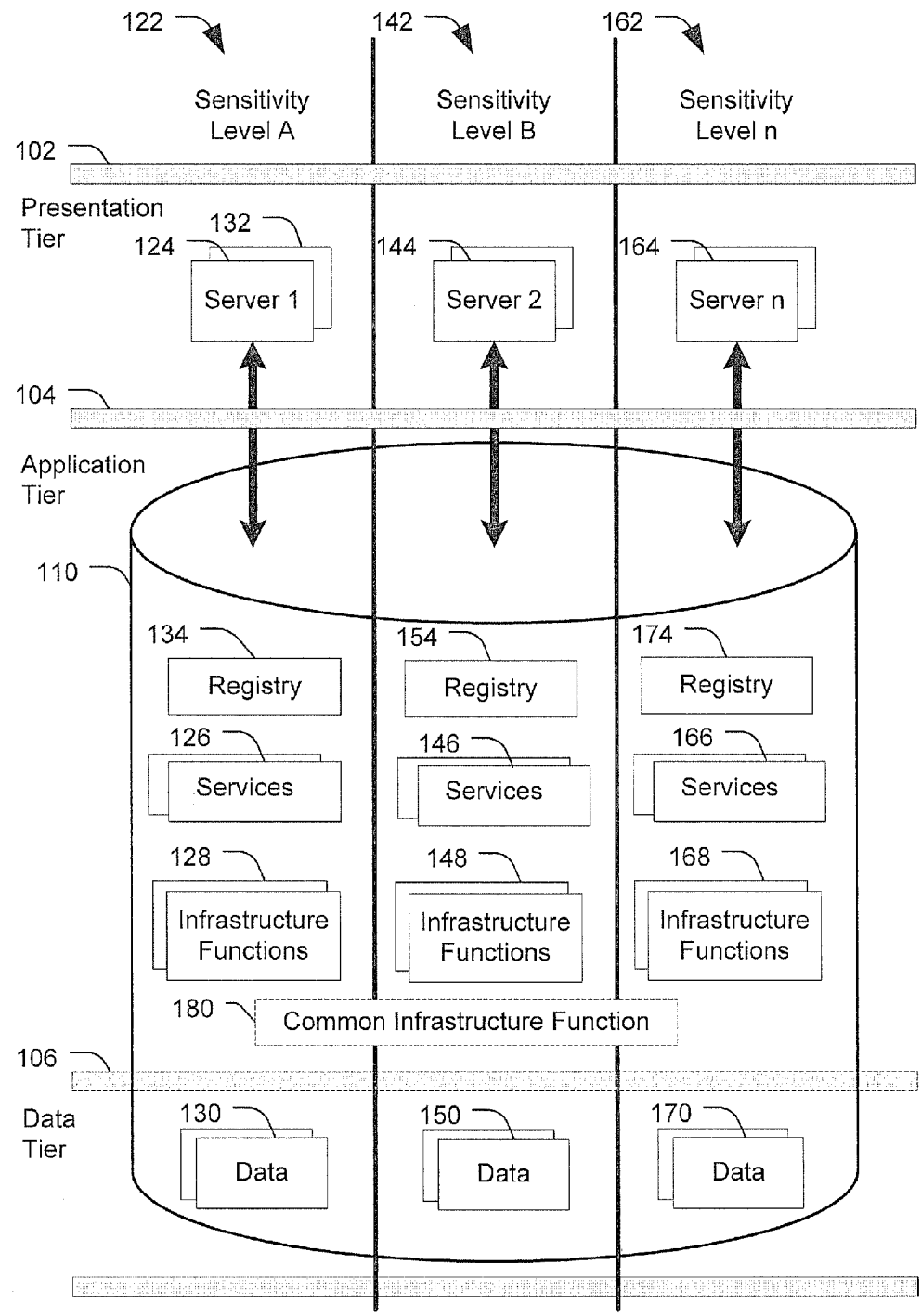
FIG. 1 is a diagram illustrating a particular embodiment of data, services and infrastructure functions hosted on shared storage.

Embodiments of systems and methods disclosed herein provide computer architectures and methods using shared storage. In a particular embodiment, functions of an Enterprise Service Bus (ESB) are provided via the shared storage. For example, one or more infrastructure functions of the ESB may be delivered by producers to consumers through the shared storage. To illustrate, traditional ESBs may connect and mediate communications and interactions between services. Thus, an ESB over shared storage, as described herein, may mediate communications and interactions between services via the shared storage.

In a particular embodiment, ESB is a computer system that provides for communication between software applications using a universal message format that can be used to implement a service-oriented architecture (SOA) within and/or between enterprises. ESB may be implemented by including a software layer between software applications and by use of an asynchronous messaging system that carries messages between the software applications. Using the standardized, universal message format, a requesting application identifies information desired from a specified target application. ESB software associated with the requesting application directs the request message to the target application over the asynchronous message system. ESB software associated with the target application may translate the request message into a format that is understandable by the target application. The target application generates a response to the request message, and the ESB software routes the response over the asynchronous message system to the requesting application, and the ESB software translates the response into a format understandable by the requesting application.

ESB is referred to as a bus by way of analogy. A physical bus (e.g. a data bus of a computer) receives a message from one resource, such as a hardware resource, and carries the message to another resource. In this case, the resources are each adapted to use a common bus protocol, such that each of the resources can communicate with other resources via the bus without having to first convert requests into particular formats determined based on the other resource participating in the exchange. In this regard, ESB operates like a bus. For example, instead of directing a communication to another software application using the target application's application program interface (API) (the API dictating the form of a request directed to the respective application), the requesting software application issues its request in a standardized "enterprise message model," and the ESB software directs and translates the request as appropriate for the target application. ESB software can be distributed to multiple computers and can be packaged in "containers" that reside with each of the software applications to handle translation and routing of messages for each software application.

While the disclosed systems and methods may perform functions similar to ESB software (such as facilitating communications between different software applications), the disclosed systems and methods may perform communications more efficiently by avoiding the additional overhead of translating between each software application's particular format and a standardized universal message format.

In another particular embodiment, a Service-oriented architecture (SOA) is provided via the shared storage. A SOA is an application architecture in which functions, or services, are delivered by service providers over a network to service consumers. Because interfaces in a SOA may be platform-independent, a client program from any device using any operating system may use a service via the SOA. In an SOA over shared storage (SOASS) as disclosed herein, data, files, file systems and non-data aware services may reside in shared storage and effectively assume the role of an ESB. Services may be hosted on the shared storage. For example, the services may be delivered by providers to consumers through the shared storage. An Application Programming Interface (API) to the shared storage includes standard read and write commands, which many computing systems, users and applications support. A services over shared storage (SOSS) system, as disclosed herein, refers to a system wherein files, file systems and services reside in the shared storage.

Additionally, in a particular embodiment, the shared storage is federated across a plurality of shared storage systems and devices. For example, a persistent common view of files, file systems and services in local shared storage and in remote shared storage may be provided. The persistent common view can represent multiple file systems distributed across a computer network. Thus, users may be able to view one or more separate file systems as though they were part of a single file system. The persistent common view may be maintained by storing information about the file system (e.g., metadata) in a specialized database (e.g., a metadata database or registry). Users of the persistent common view can access the metadata database to resolve file system requests.

FIG. 1 is a diagram illustrating a particular embodiment of data, services and infrastructure functions hosted on shared storage 110. In a particular embodiment, a service is a modular and self-contained program. A service does not depend on context or state of other services and may be designed to be invoked via a well-defined interface. Services may be called by other programs that present data to and accept data from various users. Services may be data aware. That is, services may access, analyze or act upon information content of data that they process. Infrastructure functions are non-data aware (also referred to as "data-agnostic"). That is, an infrastructure function is independent of the information content of the data that it operates on. An infrastructure function may be generally considered a part of the infrastructure of a system (e.g., a background function). To illustrate, an infrastructure function may operate on a size, a location, a security level, or a protocol of particular data, but not a data type or data content of the particular data.

FIG. 1 illustrates different levels of security (or sensitivity), including a first level 122, a second level 142 and a third level 162. The levels of security 122, 142, 162 may relate to sensitivity of data 130, 150, 170 in a data tier 106; infrastructure functions 128, 148, 168 and services 126, 146, 166 in an application tier 104; or any combination thereof. Servers 124, 144, 164 at a presentation tier 102 operating at different levels of security may access the data, infrastructure functions and services in a corresponding security level, separated from the servers, the data, the infrastructure functions, and the services at other security levels. To illustrate, a first server 124 operating at the first security level 122 may access the data 130, the infrastructure functions 128 and the services 126 at the first security level 122. Additionally, a second server 144 operating at the second security level 142 may access the data 150, the infrastructure functions 148 and the services 146 at the second security level 142. Further, a third server 164 operating at the third security level 162 may access the data 170, the infrastructure functions 168 and the services 166 at the third security level 162.

The shared storage 110 may include a plurality of physical storage devices. Examples of physical storage devices may include persistent, non-transitory, tangible storage devices and systems, such as magnetic media (e.g., hard disks, floppy disks, and magnetic tape); optical media such as CD-ROM disks; magneto-optical media (e.g., floptical disks); specially configured hardware devices; or any combination thereof.

In a particular embodiment, the shared storage 110 includes one or more storage area networks (SANs), one or more network attached storage (NAS) systems, one or more shared storage systems, such as a redundant array of independent disks (RAID) system, one or more other physical storage devices, or any combination thereof. For example, the shared storage 110 may include a dedicated storage network connecting remote storage clusters to the servers 124, 144, 164. In a particular embodiment, the shared storage 110 may be persistent storage. For example, data stored in the shared storage 110 may remain stored until it is removed.

In a particular embodiment, the application tier 104 and the data tier 106 are effectively merged in the shared storage 110, e.g., a storage tier. For example, the data 130, 150, 170 stored in the shared storage 110 and instructions to execute the services 126, 146, 166 and the infrastructure functions 128, 148, 168 may also be stored in the shared storage 110. Standard read and write commands may be used to access the shared storage 110. In a particular embodiment, a SOA is provided by combining the data tier 106, an external interface tier, an application interface tier, and a security tier in the storage layer, thus simplifying the architecture relative to a traditional SOA.

In a particular embodiment, the data 130, 150, 170, the infrastructure functions 128, 148, 168, the services 126, 146, 166, or any combination thereof, can be transferred without using server-to-server sessions. For example, a user can access the data 130 at the first security level 122 via the first server 124. The first server 124 can access the data 130 using read commands and can modify the data 130 and store the modified data using write commands. A second user can assess the data 130 via fourth server 132 that is able to access the first security level 122. The second user may access the data 130 using read commands and may store the data 130 using write commands. In a particular embodiment, the first server 124 and the fourth server 132 may utilize read after write technology to enable near real-time interaction of the first user and the second user without server-to-server sessions. For example, the first server 124 may write information to the data 130 and the fourth server 132 may read the information from the data 130 in the shared storage 110 immediately or nearly immediately after the information is written to the shared storage 110. Since server-to-server sessions are not used, certain functions associated with ESBs are handled automatically. For example, ESBs often provide protocol translation to enable two servers that use different communication protocols to interact. However, since the first server 124 writes to the shared storage 110 using a write command and the fourth server 132 reads from the shared storage 110 using a read command, no protocol translation is required to facilitate interaction of the servers 124, 132.

Other functions associated with ESBs may also be provided via the shared storage 110. For example, since the services 126, 146, 166 and the infrastructure functions 128, 148, 168 are not associated with or tied to particular servers, load balancing may be unnecessary. To illustrate, when the first user accesses the first service 126 an instance of the first service 126 may be generated at the first server 124, at the fourth server 132, or at a client device used by the first user. When a second user attempts to access the first service 126 a second instance of the first service 126 may be generated at the first server 124, at the fourth server 132, or at a client device used by the second user. Thus, load balancing based on requests for the first service 126 is not needed. If a need arises to provide more instances of the first service 126 than the shared storage 110 can accommodate (e.g., due to storage access limitations), the shared storage 110 can be expanded by adding more storage capacity to accommodate the increased need. Alternately, or in addition, instructions to implement the first service 126 can be redistributed to better serve the users (e.g., to provide copies of the instructions to implement the first service 126 that are more readily accessible to the users, such as local cache copies). In a particular embodiment, all of the infrastructure functions of the ESB system are provided through the shared storage.

In a particular embodiment, capacity of the shared storage 110 to act as an ESB may expand in direct proportion to capacity of the shared storage 110. In this embodiment, the ESB over the shared storage 110 can linearly scale to meet increased demands without a step function as may be required by traditional ESBs, since the ESB over the shared storage 110 is not tied to or associated with a particular server. To illustrate, when the ESB over the shared storage 110 requires an additional 10% performance, 10% more capacity may be added to the shared storage 110. In contrast, since traditional ESBs are tied to servers and transmission control protocol (TCP) networks, and when capacity is reached, a new server, storage, and network may be added to obtain an additional 10% of performance.

In a particular embodiment, the data 130, 150, 170; the services 126, 146, 166; the infrastructure functions 128, 148, 168; or any combination thereof, may be striped across the shared storage 110. The shared storage 110 may use one channel or multiple channels in parallel to provide high speed performance. To illustrate, when a single channel transmits data at 100 MB/sec, then 10 channels may be used to transmit data in parallel at 1 GB/sec.

In another example of providing functions of an ESB via the shared storage 110, binding may be accommodated using the infrastructure functions 128, 148, 168 in the shared storage 110. For example, certain legacy applications may be designed to utilize binding to enable communications. To accommodate use of these applications, the first infrastructure function 128 may include a binding function. The binding function may generate response messages to the legacy applications to simulate binding of the legacy application to another application or server. To illustrate, in response to the legacy application sending a binding message that requires an acknowledgement, an instance of the first infrastructure function 128 may be executed by the first server 124 to generate a dummy acknowledgement message. The legacy application may accept the dummy acknowledgement message as an indication that binding has been accomplished and continue with desired processing.

Other ESB functions may also be provided via the shared storage 110, such as quality of service control, fault tolerance, routing, addressing, service registration, discovery, etc. Thus, by hosting the infrastructure functions 128, 148, 168 on the shared storage 110, an ESB on shared storage 110 can be enabled. In a particular embodiment, hosting a particular service on the shared storage includes enabling a client to read executable instructions to implement the particular service from the shared storage and enabling the client to read data utilized by the service from the shared storage. The executable instructions to implement the particular service and the data utilized by the service may be provided to the client without using a server-to-server connection, a server session, or an application session.

In a particular embodiment, the shared storage 110 may include one or more registries 134, 154, 174 of available services, infrastructure functions, data, or any combination thereof. The registries 134, 154, 174 may be resident in the shared storage 110 and may be accessible with standard file directory commands. In a particular embodiment, the registries 134, 154, 174 may be associated with the security levels 122, 142, 162. For example, only users that are authorized to access particular data, services and infrastructure functions may access a corresponding registry. To illustrate, users authorized to access the data 130, the services 126, and the infrastructure functions 128 of the first security level 122 may be able to access the registry 134 associated with the first security level 122.

In a particular embodiment, the registries 134, 154, 174 include metadata that is associated with the data 130, 150, 170; the services 126, 146, 166; the infrastructure functions 128, 148, 168; or any combination thereof. The metadata may include information regarding a physical location of where the data resides, encryption keys associated with encrypted data, a security level of the data, and structured information that describes, explains, locates, or otherwise makes it easier to retrieve, use, or manage an information resource. The metadata may be stored separate from files to which the metadata pertains. Accordingly, the data 130, 150, 170; the services 126, 146, 166; the infrastructure functions 128, 148, 168; or any combination thereof can be hidden or restricted through controlled access to the registries 134, 154, 174. In a particular embodiment, the registries 134, 154, 174 may use standard file system protections and commands to restrict or prevent access to contents of the registries 134, 154, 174 without being encrypted and without a guard. In another particular embodiment, access to the registries 134, 154, 174 may be controlled by a high assurance data guard. Thus, by providing access controls to the registries 134, 154, 174, access to the data 130, 150, 170; the services 126, 146, 166; the infrastructure functions 128, 148, 168; or any combination thereof, can be provided without processing an entire data stream to and from the shared storage 110.

In a particular embodiment, the data 130, 150, 170; the services 126, 146, 166; the infrastructure functions 128, 148, 168; or any combination thereof, may inherit an identity, a security level, or both of a requestor. For example, common data (not shown), common services (not shown), common infrastructure functions 180, or any combination thereof may be provided in the shared storage 110. The common data, common services or common infrastructure functions 180 may be accessible via more than one security level 122, 142, 162 and may inherit the identity, the security level, or both, of the requestor. In an illustrative embodiment, the infrastructure functions 128, 148, 168 may include the common infrastructure function 180 that is shared across more than one of the security levels 122, 142, 162. In this embodiment, when a first user associated with the first security level 122 accesses the common infrastructure function 180, the common infrastructure function 180 may inherit the identity or the security level 122 of the first user. When a second user associated with the second security level 142 accesses the common infrastructure function 180, the common infrastructure function 180 implemented by the second user (e.g., a second instance of the common infrastructure function 180) may inherit the identity or the security level of the second user. Thus, if the first user is authorized to access the data 130 associated with the first security level 122 and the second user is not authorized to access the data 130 associated with the first security level 122, the common infrastructure function 180 implemented by the first user will be able to access the data 130 associated with the first security level 122, but the common infrastructure function 180 implement by the second user will not be able to access the data 130 associated with the first security level 122. Rule sets and policies can be implemented to determine the security level of the data 130, 150, 170. For example, output data of a particular service of the services 126, 146, 166 or of a particular infrastructure function of the infrastructure functions 128, 148, 168 can be analyzed based on the rule sets or policies to determine a security level of the output data. For example, the security level of the output data may be determined based on a security level of data accessed by the particular service or infrastructure function, the security level of the particular service or infrastructure function, the security level of a user that caused the output data to be generated, other factors, or any combination thereof.

The registries 134, 154, 174 may include a list of the data, the services and the infrastructure functions that are available in a directory in the shared storage 110. The directory can be virtualized across one or more local and remote locations. Publishing the services and infrastructure functions in the directory may enable use of a publish/subscribe interface to enable users, devices or applications to publish and subscribe to the services and infrastructure functions over the shared storage 110.

In a particular embodiment, the data 130, 150, 170; the services 126, 146, 166; the infrastructure functions 128, 148, 168; or any combination thereof can be added, removed, or acted upon independent of time. For example, read and write operations to the shared storage 110 may be fully decoupled and independent. Thus, a first application can write data to the shared storage 110 without communicating with or having knowledge of a second application, even when the first application and the second application access the same data, service or infrastructure function. Further, a service 126, 146, 166 or infrastructure function 128, 148, 168 can be modified while the service 126, 146, 166 or infrastructure function 128, 148, 168 is being used. In an illustrative embodiment, the data 130, 150, 170; the services 126, 146, 166; the infrastructure functions 128, 148, 168; or any combination thereof can be modified in real time. The data 130, 150, 170, the services 126, 146, 166, and the infrastructure functions 128, 148, 168 are not tied to a particular server, a particular CPU, a particular CPU core or a particular processing thread. That is, the data 130, 150, 170; the services 126, 146, 166; the infrastructure functions 128, 148, 168; or any combination thereof, may reside in the shared storage 110 and may be available for use by any of the servers 124, 132, 144, 164 or other devices (such as user client devices) that have authorization to access them.

In a particular embodiment, the services 126, 146, 166, the infrastructure functions, 128, 148, 168, or both, are stateless. For example, the services 126, 146, 166, the infrastructure functions, 128, 148, 168, or both, may not retain or contain any knowledge of their usage, current state or security level. To illustrate, instructions to implement the services 126, 146, 166, the infrastructure functions, 128, 148, 168, or both, may be read from the shared storage 110 and discarded after use, leaving the services 126, 146, 166, the infrastructure functions, 128, 148, 168, or both, unchanged in the shared storage 110.

In a particular embodiment, the shared storage 110; the services 126, 146, 166; the infrastructure functions 128, 148, 168; or any combination thereof, may enable in-order data transport. For example, information written to the data 130 may be read from the data 130 in the same order that the information was written. This embodiment may enable in-order data transport for services such as media streaming or collaboration while eliminating fragmenting and re-assembling messages. To illustrate, when a Voice over Internet Protocol application is used for communications between two users via a server-to-server session, a receiving server may receive packets in a different order than the packets were sent from a sending server. Thus, the receive server or a receiving client may reorder the packets to properly assemble voice data sent from the sending server. However, by providing in-order reading of data from the shared storage 110, a service utilizing the system illustrated in FIG. 1 can avoid this time consuming packet reordering process.

In a particular embodiment, the shared storage 110 may enable logging of all requests to access the data 130, 150, 170; the services 126, 146, 166; the infrastructure functions 128, 148, 168; or any combination thereof. For example, a permanent (e.g., persistent or indefinite) record of all access requests may be preserved. Additionally, the shared storage 110 may be configured to be fault tolerant. For example, the shared storage 110 may be configured to monitor for errors in the data 130, 150, 170; the services 126, 146, 166; the infrastructure functions 128, 148, 168; or any combination thereof. The shared storage may utilize automated error detection and error correction to automatically identify and correct faults and to recover faulted data. Additionally, hardware failures in the shared storage 110 may be addressed by automatically reconfiguring the shared storage 110. In a particular embodiment, the system illustrated in FIG. 1 may perform diagnostics against hardware of the shared storage 110 and contents of the shared storage 110. The shared storage 110 may be automatically reconfigured when a hardware failure is detected. For example, a failed storage device may be bypassed or replaced using backup copies of information stored on the failed storage device. To illustrate, a secondary path and a backup path for access to the shared storage 110 and contents of the shared storage 110 may automatically assume control. Thus, an N+1 (where N is a number of systems used to provide service and the plus one indicates one backup or secondary system) implementation may be used to replace a 2N or 2N+M (where N is a number of systems used to provide service and the plus M indicates a number of backup or secondary system) implementations such as may be used with ESB systems where data, services or infrastructure functions are tied to particular servers.

Although FIG. 1 illustrates the data 130, 150, 170; the services 126, 146, 166; the infrastructure functions 128, 148, 168; and the registries 134, 154, 174 as residing in and hosted on the shared storage 110, other combinations are possible. To illustrate, in an enterprise service bus over shared storage (ESBOSS), the infrastructure functions 128, 148, 168 and optionally the registries 134, 154, 174 may be hosted on the shared storage 110. In a service-oriented architecture over shared storage (SOAOSS), the data 130, 150, 170, the infrastructure functions 128, 148, 168, and optionally the registries 134, 154, 174 may be hosted on the shared storage 110. The SOASS may provide an architecture to loosely integrate a suite of services and the registries 134, 154, 174 may include at least one registry of available services of the suite of services. In a services over shared storage (SOSS), the data 130, 150, 170, the services 126, 146, 166, and optionally the registries 134, 154, 174 may be hosted on the shared storage 110. In other embodiments, other combinations of the data 130, 150, 170; the services 126, 146, 166; the infrastructure functions 128, 148, 168; and the registries 134, 154, 174 may reside in and be hosted on the shared storage 110. For simplicity of the following description, the term shared storage architecture is used to refer to any one or more of an ESBOSS, a SOASS, a SOSS or another embodiment where data, services, infrastructure functions, or any combination thereof, are hosted over shared storage.

Figure 2:
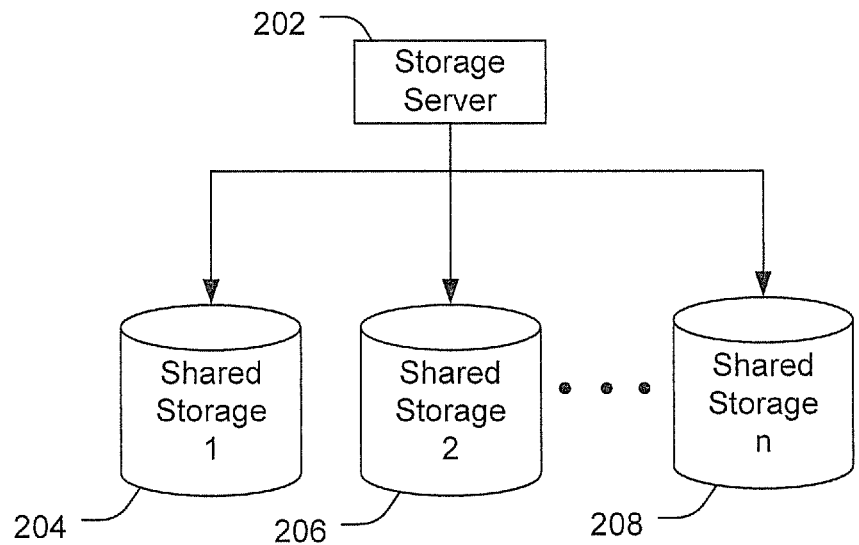
FIG. 2 is a diagram illustrating expanding capacity of a shared storage system.

FIG. 2 is a diagram illustrating a method of expanding capacity of a shared storage system. As shown in FIG. 2, the capacity of a shared storage system, such as the shared storage 110 of FIG. 1, can be expanded by adding physical storage devices and connections. To illustrate, a storage server 202 may facilitate communications within a shared storage system. The storage server 202 may be connected to a first shared storage device 204, a second shared storage device 206 and one or more additional shared storage devices 208. Providing an added shared storage device and coupling the added shared storage device to the storage server 202 expands the capacity of the shared storage system. In a particular embodiment, capacity of the shared storage system to provide services and infrastructure functions may expand in direct proportion to capacity of the shared storage system.

Figure 3:
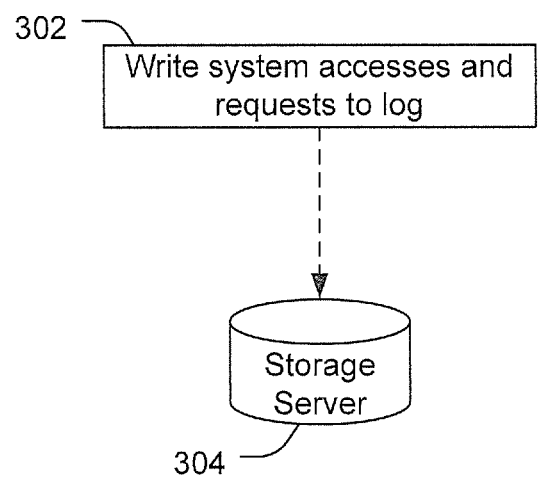
FIG. 3 is a diagram illustrating logging access requests to shared storage.

FIG. 3 is a diagram illustrating logging access requests to shared storage. In a particular embodiment, at 302, system accesses and requests are written to a storage server 304. The storage server 304 may be an element of a shared storage system, (such as the storage server 202 of FIG. 2). The storage server 304 may log all data access requests. For example, the storage server may generate a persistent record of requests to access data, services, infrastructure functions, registries, or any combination thereof, hosted on shared storage.

Figure 4:
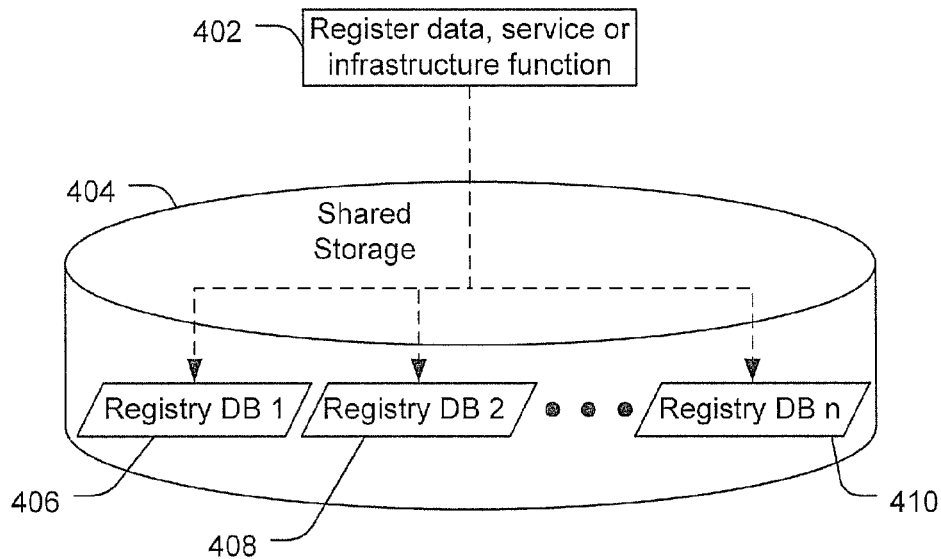
FIG. 4 is a diagram illustrating multiple registries in shared storage.

FIG. 4 is a diagram illustrating multiple registries in shared storage. In a particular embodiment, at 402, a registry of data, services, infrastructure functions, or any combination thereof (such as the registries 134, 154, 174 of FIG. 1) may be stored in shared storage 404 (such as the shared storage 110 of FIG. 1). The data, services, infrastructure functions, or any combination thereof, may also reside in the shared storage 404. In a particular embodiment, multiple registries, such as a first registry database 406, a second registry database 408, and one or more third registry databases 410 may reside in the shared storage 404. In a particular embodiment, the registry databases 406, 408, 410 may include metadata related to data, services or infrastructure functions at different security levels, such as the security levels 122, 142, 162 of FIG. 1. In a particular embodiment, the registry databases 406, 408, 410 may include information related to more than one shared storage system. For example, as explained in more detail below, the registry databases 406, 408, 410 may be federated registries that include information related to both a local shared storage system (e.g., the shared storage 404) and one or more remote shared storage systems. The registry databases 406, 408, 410 may be maintained by identifying data, services, and infrastructure functions in the shared storage and registering the identified data, services, and infrastructure functions.

Figure 5:
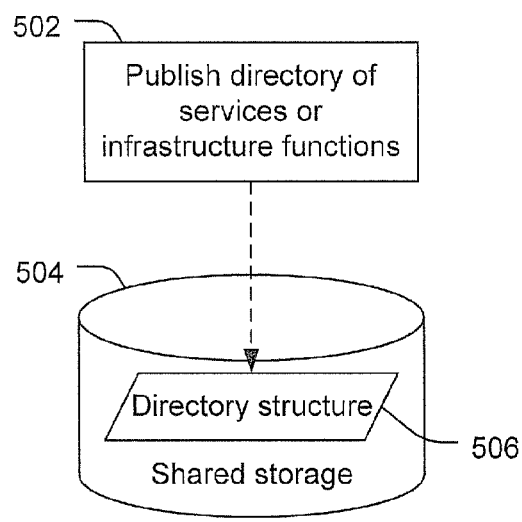
FIG. 5 is a diagram illustrating publishing of a directory structure.

FIG. 5 is a diagram illustrating publishing of a directory structure. As shown in FIG. 5, services, infrastructure functions, or any combination thereof may be published, at 502, to a directory structure 506 in shared storage, such as the shared storage 110 of FIG. 1. The directory structure 506 may enable access to the services and/or infrastructure functions using standard file directory commands. Additionally, the directory structure may enable use of a publish/subscribe interface to enable users, devices or applications to publish and subscribe to the services or infrastructure functions.

Figure 6:
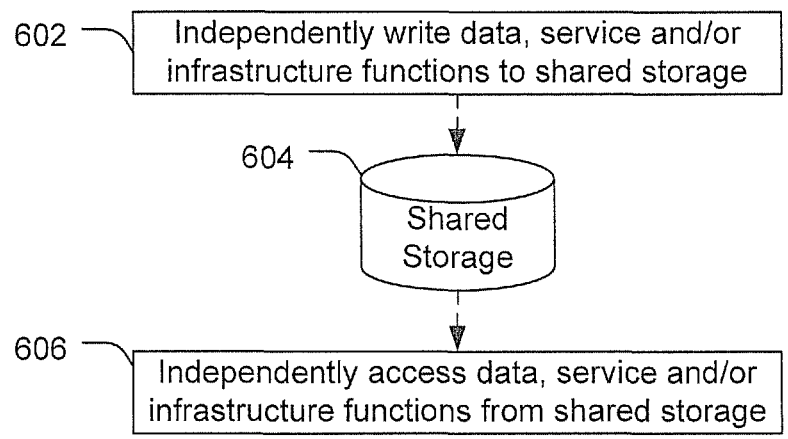
FIG. 6 is a diagram illustrating writing to and reading from shared storage asynchronously.

FIG. 6 is a diagram illustrating writing to and reading from the shared storage asynchronously. In a particular embodiment, writing data, services, or infrastructure functions, at 602, to shared storage 604 may be independent of accessing, at 606, the data, services, or infrastructure functions, from the shared storage 604. For example, data, services or infrastructure functions may be written to and read from the shared storage 604 asynchronously, without having to establish a session between a writing server and a reader server. To illustrate, hosting a particular service (or infrastructure function) on the shared storage 604 may enable a client to read executable instructions to implement the particular service from the shared storage 604 and to read data utilized by the service from the shared storage 604. The executable instructions to implement the particular service and the data utilized by the service may be provided to the client without using a server-to-server connection. When the particular service enables communication between the client and a producer device, a portion of data written to the shared storage 604 by the producer device may be read from the shared storage 604 by the client while a second portion of the data is being written to the shared storage 604 by the producer device. To illustrate, a read behind write process may be used to read data from the shared storage 604 while data is still being written to the shared storage 604. In a media streaming example, a provider service may write media data to the shared storage 604 and a consumer service may read the media data from the shared storage 604 in real-time or near real-time. This arrangement may simulate streaming media directly from the provider service to the consumer service via a server-to-server connection but without using a server-to-server connection.

Figure 7:
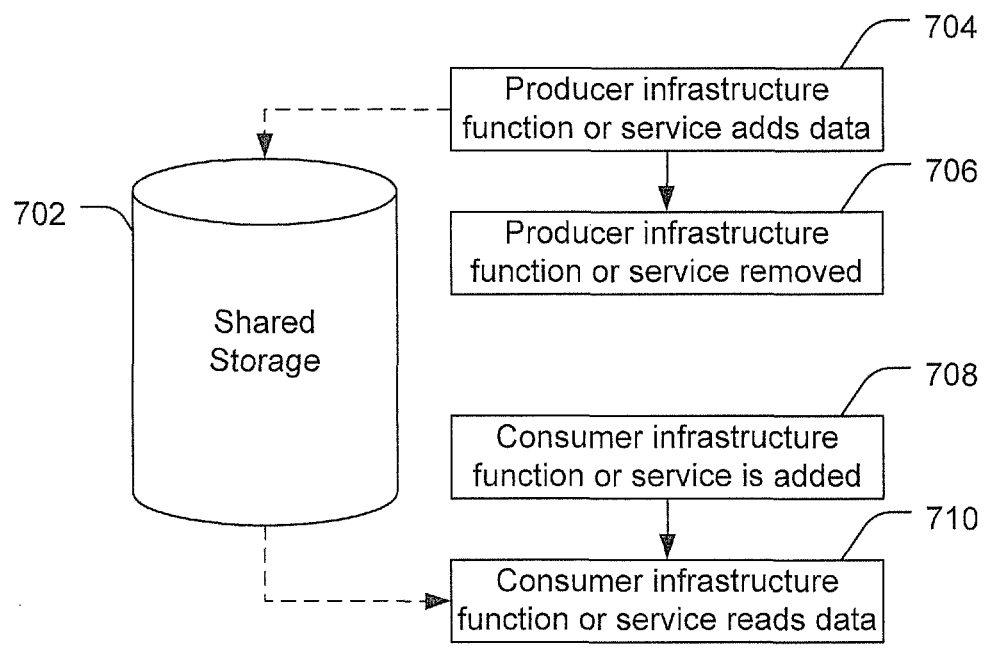
FIG. 7 is a diagram illustrating addition and removal of services and infrastructure functions with respect to shared storage.

FIG. 7 is a diagram illustrating addition and removal of services and infrastructure functions with respect to shared storage. As illustrated in FIG. 7, services, infrastructure functions, or both, can be implemented by a producer or a consumer at any time. To illustrate, at 704, a producer infrastructure function or service may add data to shared storage 702, such as the shared storage 110 of FIG. 1. The producer infrastructure function or service may subsequently be removed or terminated, 706. For example, the user may terminate the producer infrastructure function or service. At 708, a consumer infrastructure function or service is added or implemented. The consumer infrastructure function or service may be initiated before the producer infrastructure function or service, after the producer infrastructure function or service is initiated but before producer infrastructure function or service is terminated, or after the producer infrastructure function or service is terminated. At 710, the consumer infrastructure function or service reads data from the shared storage 702. The consumer infrastructure function or service can read data written to the shared storage 702 immediately or nearly immediately after it is written by the producer infrastructure function or service or at a later time, e.g., after the producer infrastructure function or service is terminated.

Figure 8:
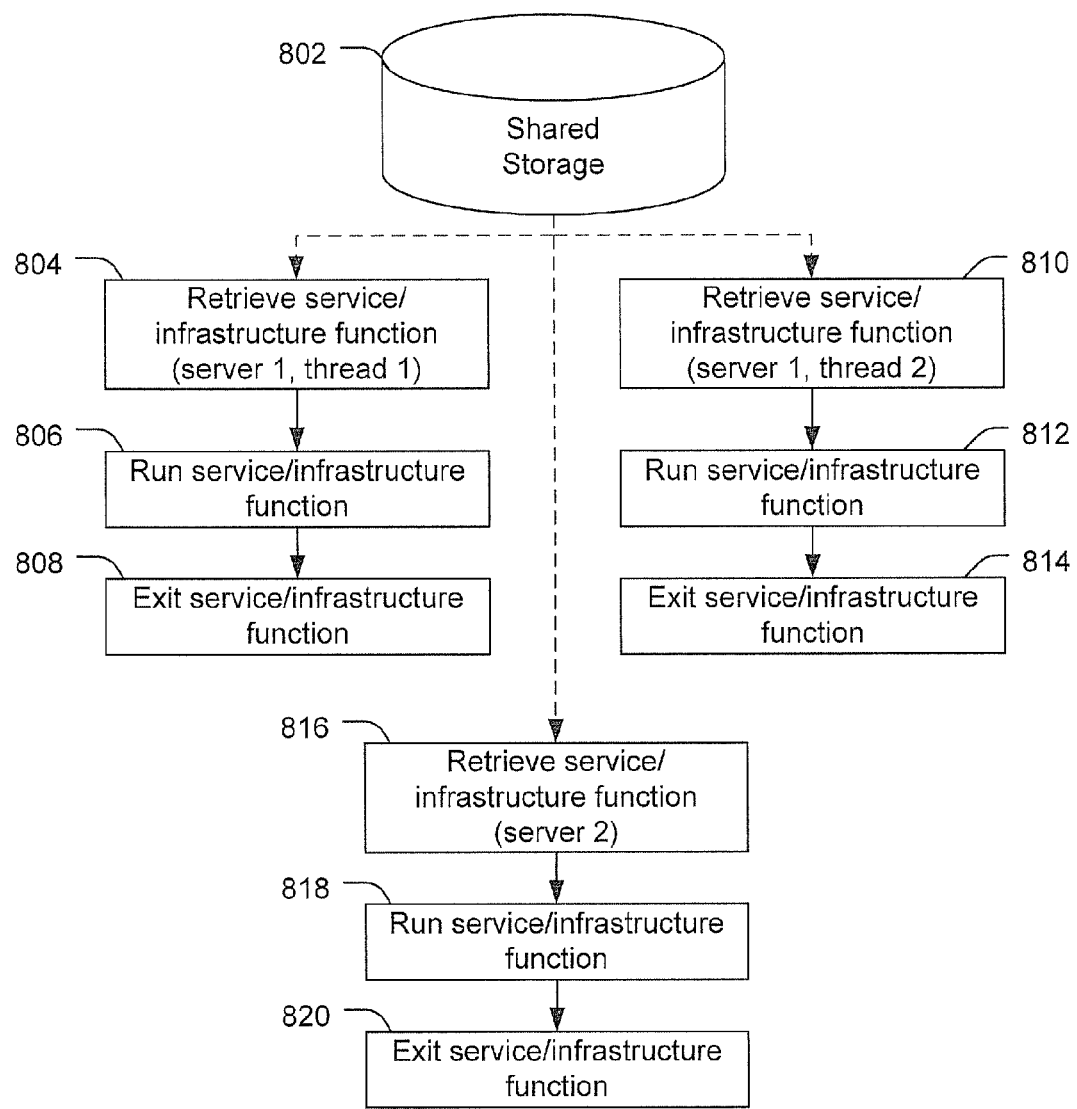
FIG. 8 is a diagram illustrating accessing services or infrastructure functions in shared storage independent of server, CPU, and thread.

FIG. 8 is a diagram illustrating accessing a service or infrastructure function in shared storage independent of a server instance, a CPU, and a processing thread. In a particular embodiment, instructions to implement a service or infrastructure function may reside on shared storage 802, such as the shared storage 110 of FIG. 1. A first server (or another processing device, such as a client device) may access the shared storage 802 and retrieve the service or infrastructure function, at 804. The service or infrastructure function may be implemented at the first server in a first processing thread. The first server may run the service or infrastructure function in the first processing thread at 806 and may exit the service or infrastructure function, at 808.

In a particular embodiment, the first server may independently access the shared storage 802 and retrieve the service or infrastructure function, at 810. The service or infrastructure function may be independently implemented at the first server in a second processing thread. The first server may run the service or infrastructure function in the second processing thread, at 812, and may exit the service or infrastructure function, at 814. Additionally, or in the alternative, a second server may independently access the shared storage 802 and retrieve the service or infrastructure function, at 816. The service or infrastructure function may be independently implemented at the second server. The second server may run the service or infrastructure function, at 818, and may exit the service or infrastructure function, at 820. Thus, access to and implementation of services, infrastructure functions, or both, in the shared storage 802 may be performed independently by multiple servers, multiple processors, multiple threads, or any combination thereof. Each instance of a service or infrastructure function implemented by a server, a processor or a thread may be independent and may not modify the instructions to implement the service or infrastructure function in the shared storage 802.

Figure 9:
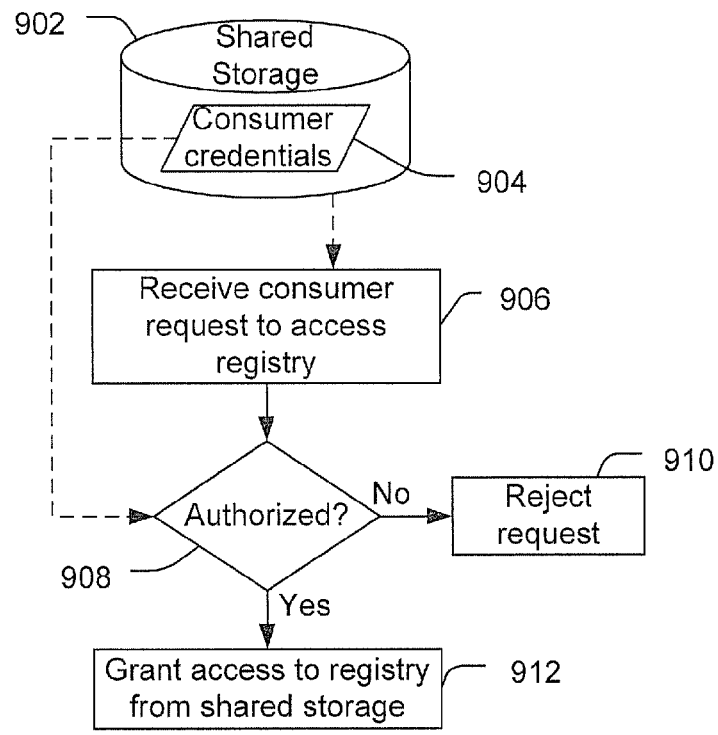
FIG. 9 is a diagram illustrating restricting access to a registry.

FIG. 9 is a diagram illustrating restricting access to a registry. In a particular embodiment, consumer credentials 904 may be stored in shared storage 902, such as the shared storage 110 of FIG. 1. The consumer credentials 904 may include authentication information, user identification information, security level information, access permission information, and other data that is used to determine whether access to a registry, such as one or more of the registries 134, 154, 174 of FIG. 1 is authorized. When a request to access the registry is received from a consumer (e.g., a user, a user device, an application, a server, a service, an infrastructure function, or another consumer), at 906, authentication or access information associated with the request may be compared to the consumer credentials 904. At 908, a determination is made whether the consumer is authorized to access the registry. When the consumer is not authorized to access the registry, the request is rejected, at 910. When the consumer is authorized to access the registry, access is granted, at 912, to the registry from the shared storage 902.

In a particular embodiment, the consumer credentials include a security level associated with a user. The request to access the registry may include information identifying the user. Thus, the identification information may be compared to the consumer credentials 904 to determine whether access to the registry is authorized based on the security level of the user. Additionally, since services and infrastructure functions implemented or accessed by the user may inherit the user's identification or security level, requests to access the registry by a service or infrastructure function implemented or accessed by the user may have the same access rights as the user.

Figure 10:
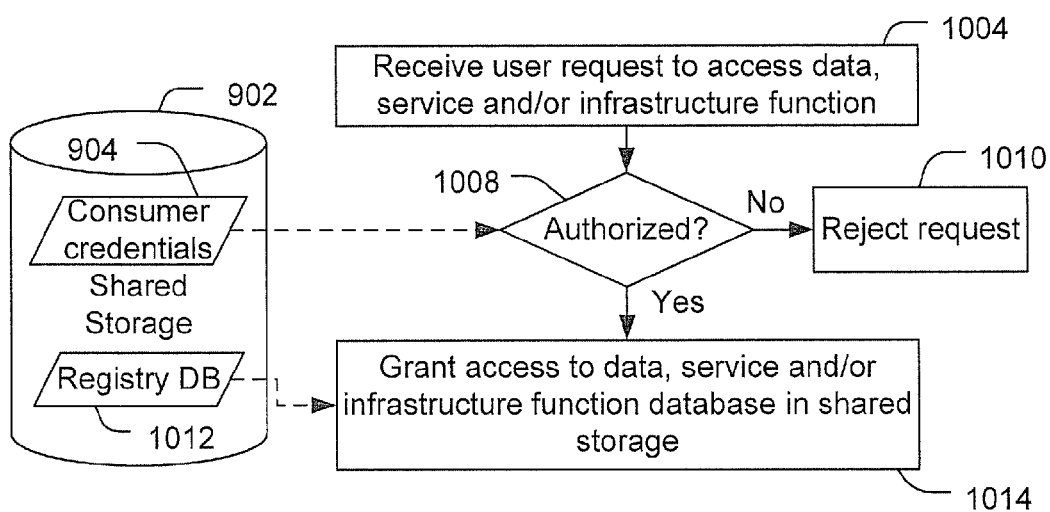
FIG. 10 is a diagram illustrating restricting access to data, services or infrastructure functions using a registry.

FIG. 10 is a diagram illustrating restricting access to data, services or infrastructure functions using a registry. As described with reference to FIG. 9, access to a registry 1012 may be restricted based on consumer credentials 904. In a particular embodiment, the registry 1012 may include metadata that enables reconstruction of data, services or infrastructure functions that is striped across multiple physical storage devices of the shared storage 902. The data, services or infrastructure functions may also be encrypted. The metadata in the registry 1012 may include information to gather pieces of the data, services or infrastructure functions from the shared storage 902. Additionally, when the data, services or infrastructure functions are encrypted, the metadata may include keys to decrypt the pieces. Thus, the data, services and infrastructure functions may be reassembled or reconstructed and optionally decrypted, using information in the registry 1012. Accordingly, by controlling access to the registry 1012, access to the data, services and infrastructure functions in the shared storage 902 may also be controlled. Access to the registry 1012 may be restricted based on the security level of the user, a security level of an application, a security level of the data in the shared storage 902, rules and policies, or other criteria.

In a particular embodiment, when a request to access data, a service or an infrastructure function is received from a user, at 1004, a determination is made whether the user is authorized to access the data, service or infrastructure function, at 1008. When the user is not authorized to access the data, service or infrastructure function, the request is rejected, at 1010. When the consumer is authorized to access the data, service or infrastructure function, access is granted, at 1012, to the data, service or infrastructure function from the shared storage 902.

Figure 11:
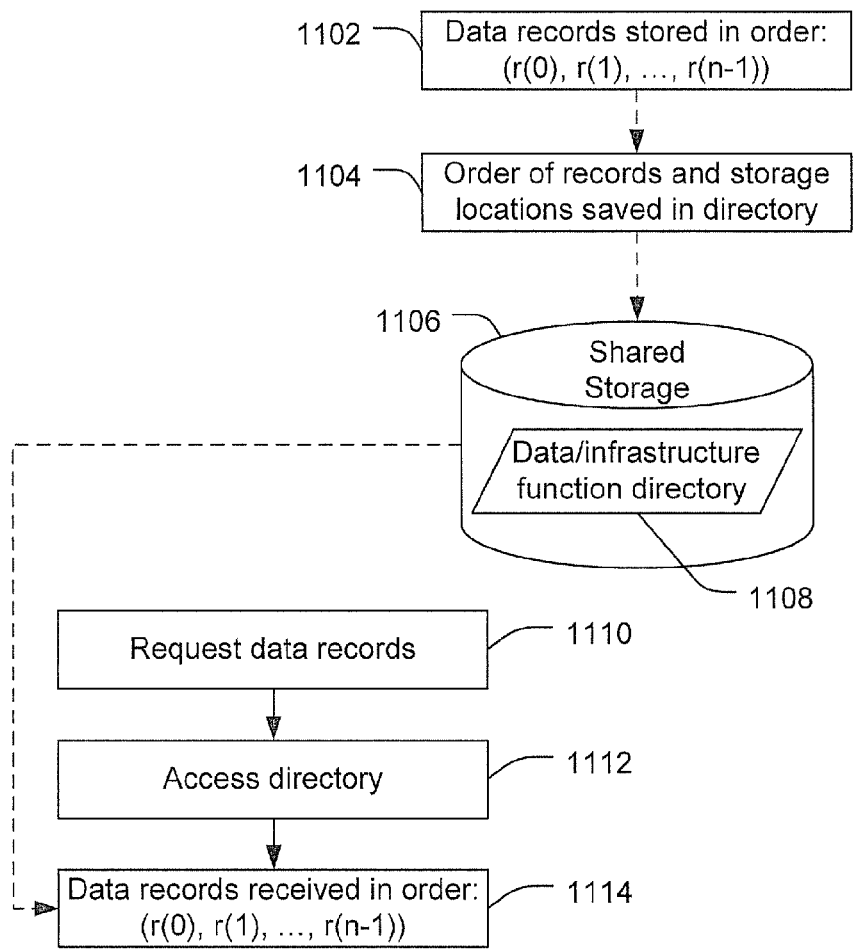
FIG. 11 is a diagram illustrating reading data in a written order.

FIG. 11 is a diagram illustrating reading data in a written order. In a particular embodiment, data records are stored, at 1102, in a particular order in shared storage 1106. The order in which the data records were written to the shared storage 1106 and the storage locations of the data records are saved, at 1104, in a directory 1108. When a request to access the data records is received, at 1110, the directory 1108 is accessed, at 1112. The order in which the data records were written to the shared storage 1106 and the storage locations of the data records are determined from the directory 1108, and the data records are retrieved, at 1114, from the shared storage 1106 in the order that the data records were written to the shared storage 1106.

By reading the data records in the order that they were written to the memory, in-order data transport is provided. Thus, services that utilize data in a particular order can be enabled without using a reorder process to sort the data into a desired order. To illustrate, when a media stream is sent to a user device via a server-to-server session, a receiving server may receive media packets in a different order than the media packets were sent from a sending server. Thus, the receive server or a receiving client may sort the media packets to properly place the media packets in a correct order for presentation of the media stream. However, by providing in-order reading of data from the shared storage 1106, a service utilizing the system illustrated in FIG. 11 can avoid this time consuming sorting process.

Figure 12:
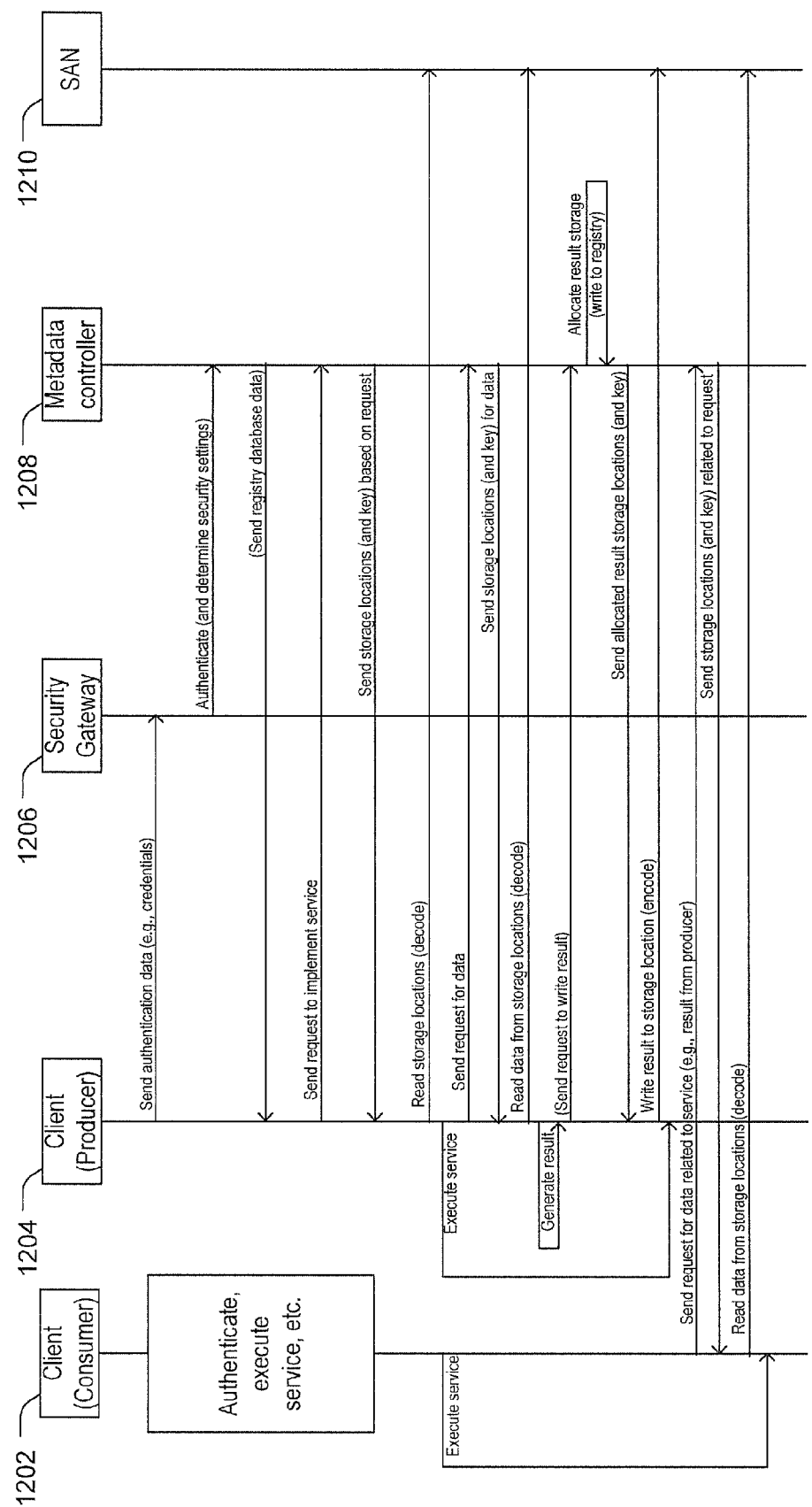
FIG. 12 is a diagram illustrating messaging in a shared storage system.

FIG. 12 is a diagram illustrating messaging in a shared storage architecture. In a particular embodiment, the shared storage architecture includes a producer, such as a first client 1204. The producer is configured to implement services, infrastructure functions, or both, from shared storage, such as a storage area network (SAN) 1210. Instructions to implement the services, the infrastructure functions, or both, may be stored at various locations across the SAN 1210. For example, the instructions may be striped across the SAN 1210. Additionally, the instructions may be stored encoded in the SAN 1210. To access a service (or an infrastructure function) from the SAN 1210, the producer may use information about the storage locations of the instructions (also called "metadata") to assemble an executable version of the instructions (i.e., an instance of the service) at the client 1204. In a particular embodiment, the shared storage architecture may restrict access to the service based on user access or security levels. For example, metadata to access the service may only be provided to users that are authorized to access the service based on user credentials. A security gateway 1206 may check the user credentials or other authentication data and authorize a metadata controller 1208 to provide certain metadata to the client 1204. Thus, the client 1204 is only able to see or access services that a user of the client is authorized to access.

A particular embodiment of messaging in the shared service architecture to implement the process described above is shown in FIG. 12. In the particular embodiment, the client 1204 sends authentication data (such as credentials) to the security gateway 1206. The security gateway 1206 compares the authentication data to authentication data in a database (not shown) that is accessible to the security gateway 1206 to determine security settings or attributes associated with the client 1204. The security gateway 1206 sends a message to the metadata controller 1208 authenticating the client 1204. The security gateway 1206 may also send the security settings or attributes to the metadata controller 1208. The metadata controller 1208 sends at least a portion of a registry database to the client 1204. The registry database may include metadata for the SAN 1210 and the portion of the registry database sent to the client 1204 may include metadata related to data, services or infrastructure functions of the SAN 1210 that the client is authorized to access. In a particular embodiment, the portion of the registry database sent to the client 1204 includes a directory structure. The directory structure may identify the data, services and infrastructure functions that the client is authorized to access, but may not include information needed to access the data, services and infrastructure functions. For example, the directory structure may not include storage location information or decryption keys needed to access the data, services and infrastructure functions.

The client 1204 may send a request to access a service to the metadata controller 1208. If the client 1204 is authorized to access the service, the metadata controller 1208 sends storage location information for the service to the client 1204. If the instructions to implement the service are encrypted in the SAN 1210, the metadata controller 1208 may also send decryption keys.

The client 1204 may read the storage locations of the SAN 1210 that are indicated in the storage location information and, if the instructions are encoded, decode the instructions using the decryption keys. The client 1204 may execute the service using the instructions.

In a particular embodiment, the service may inherit access or security level attributes of the client 1204 to enable the service to access data from the SAN 1210. For example, the service may send a request for data to the metadata controller 1208. The metadata controller 1208 may send storage location information for the requested data to the client 1204 if the service is authorized to access the data based on attributes inherited from the user. If the data is encrypted in the SAN 1210, the metadata controller 1208 may also send decryption keys for the data to the client 1204. The service may read the data from the SAN 1210 using the storage location information and may decode the data, if needed, using the keys.

Some services may generate results when executed. For example, a service may analyze or perform computations using the data accessed from the SAN 1210. In another example, a user may provide input to the client 1204 that generates result data via the service. For example, text input by the user, via the client, may generate result data from the service. To illustrate, the service may be a collaboration application, an instant messaging application, a communication application, or another application that received information at the client 1204 to produce the result data. When the service generates the result data, the service may send a write request to the metadata controller 1208. The metadata controller 1208 may allocate a result storage location. The metadata controller may also update metadata associated with the SAN 1210 to indicate that the result data is stored at the result storage location and may write the result storage location to the registry. The metadata controller 1208 may send the result storage location to the client 1204. When the result data is to be encrypted for storage, the metadata controller 1208 may also send encryption keys to be used to encrypt the result data. The service may encrypt the result data using the encryption keys and write the result data to the allocated result storage locations of the SAN 1210. The service may be terminated by the client 1204 without writing status information regarding the service to the SAN 1210.

In a particular embodiment, a second client 1202 may access the result data from the SAN 1210. For example, the second client 1202 may be authenticated and may execute a service in a manner similar to that described above with respect to the first client 1204. The second client 1202 may implement the same service or a different service independently of the first client 1204. The service implemented by the second client 1202 may send a request to access the result data produced by the first client 1204 to the metadata controller 1208. If the service implemented at the second client 1202 is authorized to access the result data, the metadata controller 1208 sends storage location information (and keys if needed) related to the result data to the second client 1202. The service at the second client 1202 reads the result data from the SAN 1210 using the storage location information (and the keys if needed).

The service at the first client 1204 and the service at the second client 1202 may be instances of the same service, or may be different services. Additionally, the services may be executed concurrently or sequentially. For example, the service at the second client 1202 may read the result data from the SAN 1210 immediately or nearly immediately after the service at the first client 1204 writes the result data to the SAN 1210. In another example, the service at the second client 1202 may read the result data from the SAN 1210 a significant time after the service at the first client 1204 writes the result data to the SAN 1210, e.g., after the service at the first client 1204 has been terminated. Further, the service at the first client 1204 and the service at the second client 1202 may read data from the SAN 1210 using standard read commands and may write data to the SAN 1210 using standard write commands. Accordingly, no communication protocol translation is needed. Thus, real-time or delayed interaction between the first client 1204 and the second client 1202 can be provided through the SAN 1210.

Figure 13:
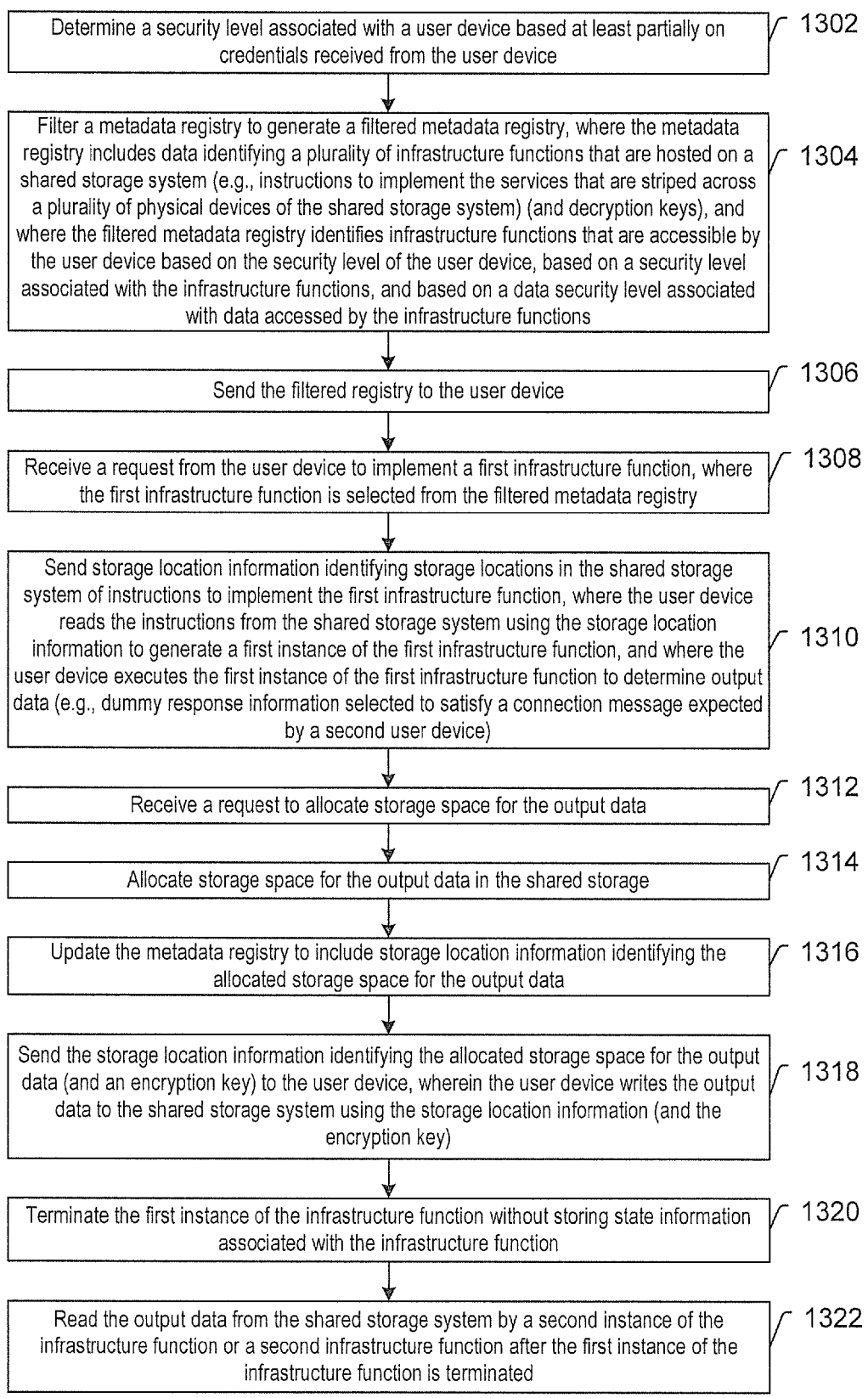
FIG. 13 is a flow chart illustrating a method of providing a Enterprise service bus (ESB) in shared storage.

FIG. 13 is a flow chart illustrating a method of providing an Enterprise service bus (ESB) in shared storage. In a particular embodiment, the method includes, at 1302, determining a security level associated with a user device based at least partially on credentials received from the user device. For example, the security level associated with the user device may be determined by a security gateway, such as the security gateway 1206 of FIG. 12.

The method may also include, at 1304, filtering a metadata registry to generate a filtered metadata registry. For example, the metadata registry may be filtered by the security gateway or by a metadata controller, such as the metadata controller 1208 of FIG. 12. The filtered metadata registry may identify infrastructure functions that are accessible by a user device based on a security level of the user device, based on security levels associated with the infrastructure functions, based on a data security level associated with data accessed by the infrastructure functions, or any combination thereof. For example, the metadata registry may be filtered based on the credentials associated with the user device or the security level associated with the user device.

The method may also include, at 1306, sending the filtered metadata registry to the user device. The method may further include, at 1308, receiving a request from the user device to implement a first infrastructure function. The first infrastructure function may be selected from the filtered metadata registry. Instructions to implement the first infrastructure function may be striped across a plurality of physical storage devices of a shared storage system. The method may include sending storage location information identifying storage locations in the shared storage system of the instructions to implement the first infrastructure function. For example, the storage location information may be determined based on metadata associated with the shared storage system. In an illustrative embodiment, the metadata registry includes data identifying a plurality of infrastructure functions that are hosted on the shared storage system and decryption keys associated with the infrastructure functions. In this embodiment, the decryption key or keys for the first infrastructure function may be sent in addition to the storage location information.

The user device may read the instructions from the shared storage system using the storage location information to generate a first instance of the first infrastructure function. If decryption keys are provided, the user device may also decrypt the instructions using the decryption keys.

In a particular embodiment, the user device may execute the first instance of the first infrastructure function. During execution of the first instance, the first instance may be restricted from accessing data stored in the shared storage system based at least partially on the security level of the user device. In a particular embodiment, the first instance may determine output data, and the method may include, at 1312, receiving a request to allocate storage space for the output data. For example, the first instance of the first infrastructure function may generate or select dummy response information. To illustrate, the dummy response information may be selected to satisfy a connection message expected by a second user device. Thus, the first infrastructure function may simulate a binding function of an ESB.

The method may also include, at 1314, allocating storage space for the output data in the shared storage system and updating the metadata registry to include storage location information identifying the allocated storage space for the output data, at 1316. The method may further include, at 1318, sending the storage location information identifying the allocated storage space to the user device.

The user device may write the output data to the shared storage system using the storage location information. In a particular embodiment, the user device may terminate the first instance of the infrastructure function without storing state information associated with the infrastructure function, at 1320. Additionally, the output data may be read from the shared storage system by a second instance of the infrastructure function or a second infrastructure function after the first instance of the infrastructure function is terminated, at 1322.

Figure 14:
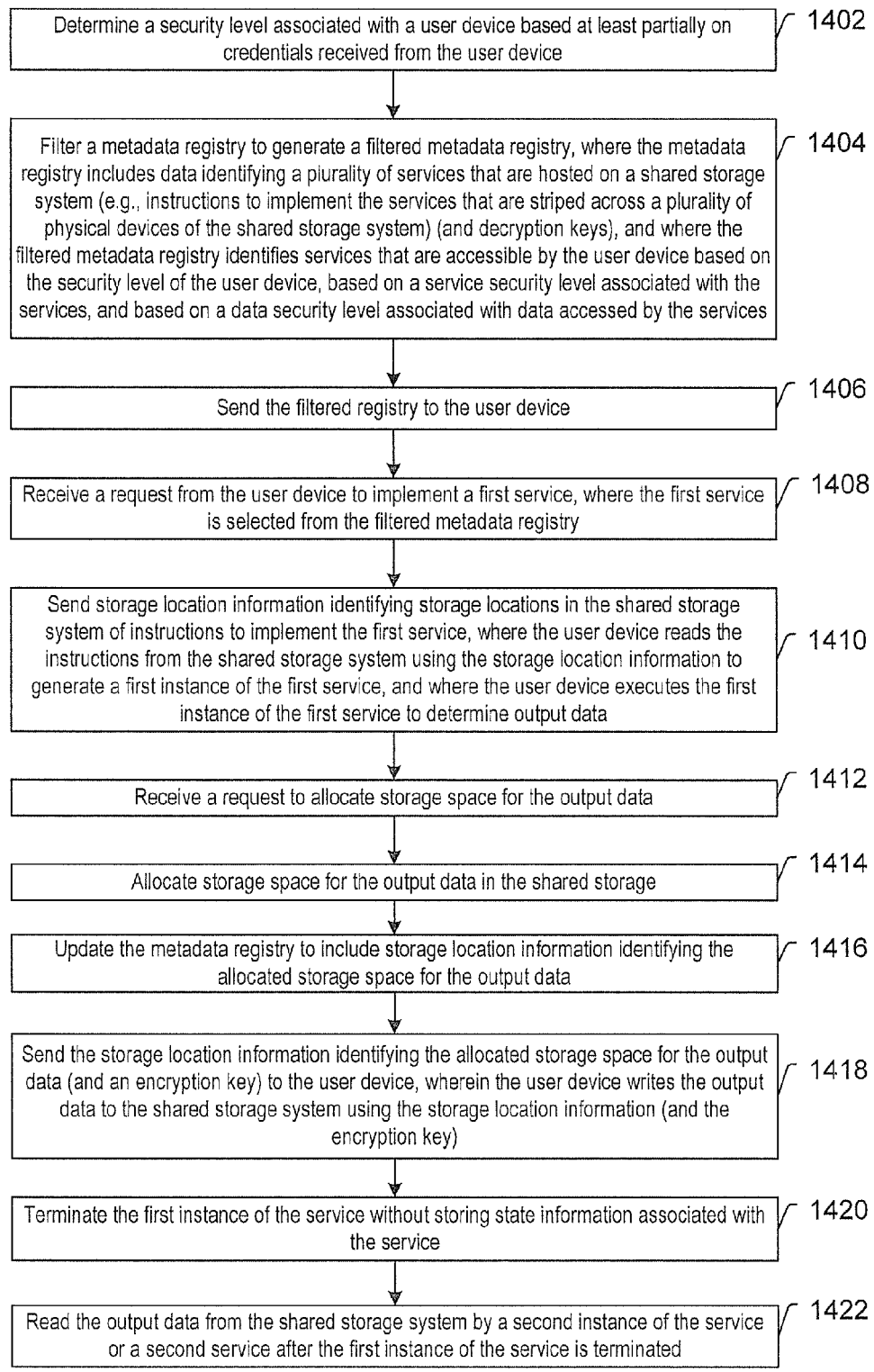
FIG. 14 is a flow chart illustrating a method of providing services over shared storage.

FIG. 14 is a flow chart illustrating a method of providing services over shared storage. In a particular embodiment, the method includes, at 1402, determining a security level associated with a user device based at least partially on credentials received from the user device. For example, the security level associated with the user device may be determined by a security gateway, such as the security gateway 1206 of FIG. 12.

The method may also include, at 1404, filtering a metadata registry to generate a filtered metadata registry. For example, the metadata registry may be filtered by the security gateway or by a metadata controller, such as the metadata controller 1208 of FIG. 12. The metadata registry may identify services including data identifying a plurality of services that are hosted on a shared storage system. For example, instructions to implement the services may be striped across a plurality of physical devices of the shared storage system. The metadata registry may also include decryption keys when the instructions are stored in an encrypted format. The filtered metadata registry may include information about services hosted on the shared storage system that are accessible by the user device based on the security level of the user device, based on security levels associated with the services, based on a data security level associated with data accessed by the services, or any combination thereof. For example, the metadata registry may be filtered based on the credentials associated with the user device or the security level associated with the user device.

The method may also include, at 1406, sending the filtered metadata registry to the user device. The method may further include, at 1408, receiving a request from the user device to implement a first service. The first service may be selected from the filtered metadata registry.

The method may include, at 1410, sending storage location information identifying storage locations in the shared storage system of the instructions to implement the first service. For example, the storage location information may be determined based on metadata associated with the shared storage system. In an illustrative embodiment, the metadata registry includes data identifying a plurality of services that are hosted on the shared storage system and decryption keys associated with the services. In this embodiment, the decryption key or keys for the first service may be sent in addition to the storage location information.

The user device may read the instructions from the shared storage system using the storage location information to generate a first instance of the first service. If decryption keys are provided, the user device may also decrypt the instructions using the decryption keys.

In a particular embodiment, the user device may execute the first instance of the first service. During execution of the first instance, the first instance may be restricted from accessing data stored in the shared storage system based at least partially on the security level of the user device. In a particular embodiment, the first instance may determine output data, and the method may include, at 1412, receiving a request to allocate storage space for the output data.

The method may also include, at 1414, allocating storage space for the output data in the shared storage system, and updating the metadata registry to include storage location information identifying the allocated storage space for the output data, at 1416. The method may further include, at 1418, sending the storage location information identifying the allocated storage space to the user device. When the output data is to be encrypted in the shared storage system, encryption keys to be used to encrypt the output data may also be send to the user device.

The user device may write the output data to the shared storage system using the storage location information (and the encryption keys, if provided). In a particular embodiment, the user device may terminate the first instance of the infrastructure function without storing state information associated with the infrastructure function, at 1420. Additionally, the output data may be read from the shared storage system by a second instance of the service or a second service after the first instance of the first service is terminated, at 1422.

Figure 15:
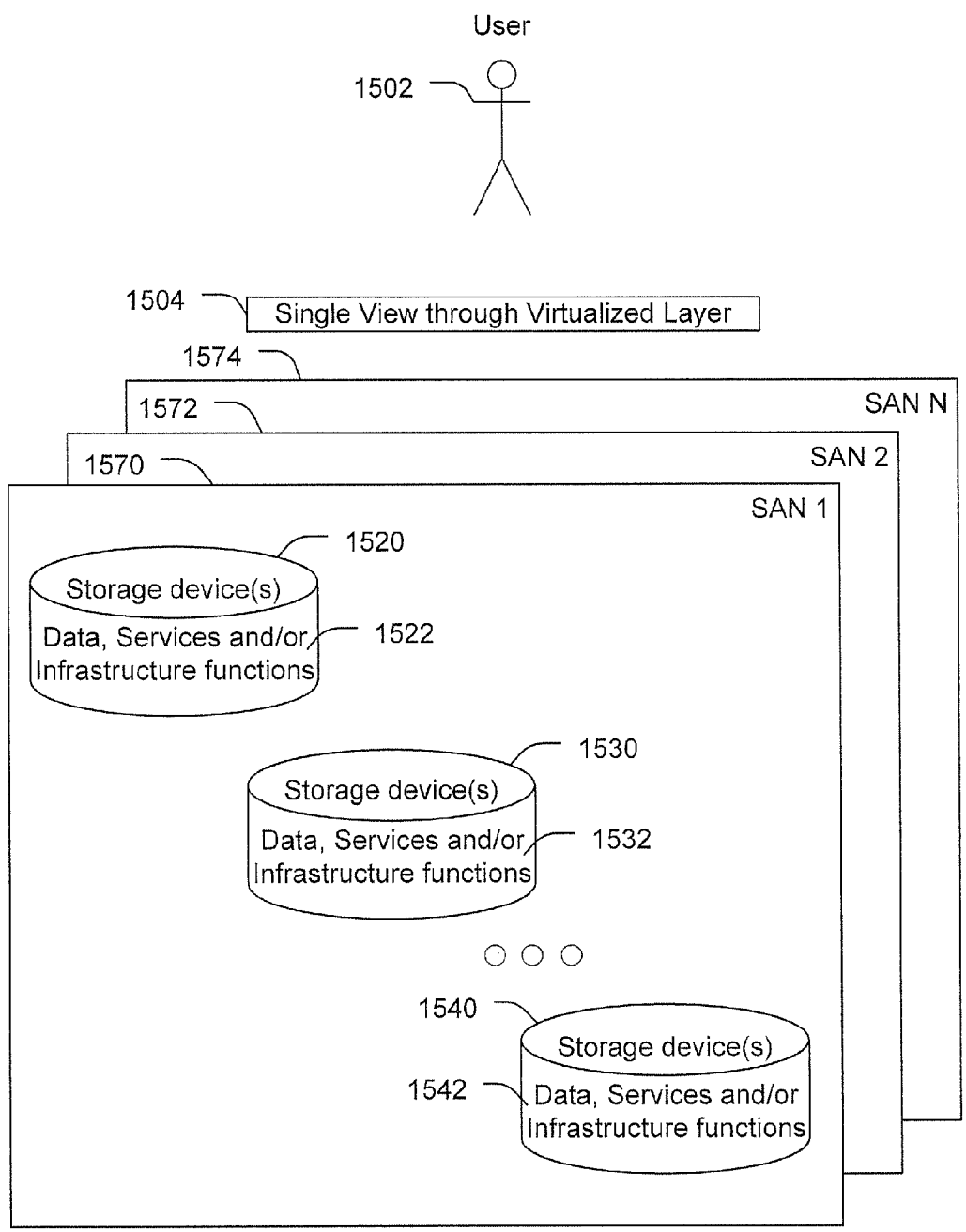
FIG. 15 is a diagram illustrating a federate shared storage architecture.

FIG. 15 is a diagram illustrating a federate shared storage architecture. In a particular embodiment, a plurality of shared storage systems, such as a first storage area network (SAN) 1570, a second SAN 1572 and one or more third SANs 1574 may be provided as multiple instances of shared storage in a shared storage architecture. The SANs 1570, 1572, 1574 may each include one or more storage devices, such as a first storage device 1520, a second storage device 1530 and one or more third storage devices 1540. Each of the instances of shared storage (e.g., the first SAN 1570, the second SAN 1572 and the third SAN 1574, or the first storage device 1520, the second storage device 1530, the third storage device 1540) may includes data 1522, 1532, 1542 and file system metadata separated from the data to implement a shared storage architecture, such as one of the shared storage architectures described with reference to FIG. 1. The file system metadata may include location data that specifies storage location information related to the data 1522, 1532, 1542.

In a particular embodiment, a persistent common view of local and remote files, file systems, services, infrastructure functions, or any combination thereof, may be provided via a single view through a virtualized layer 1504. For example, when a user has direct access to the first SAN 1570 (e.g., the first SAN 1570 is local to the user, and the user has remote access to the second SAN 1572), the single view through the virtualized layer 1504 may include federated metadata associated with the first SAN 1570 and with the second SAN 1572. Thus, data, services and infrastructure functions available in the first SAN 1570 and data, services and infrastructure functions available in the second SAN 1572 may be accessed via the persistent common view (e.g., as though both the first SAN 1570 and the second SAN 1572 were local to the user 1502). To provide the persistent common view, metadata associated with the data, services and infrastructure functions at the first SAN 1570 may be federated with metadata associated with the data, services and infrastructure functions at the second SAN 1572. Additionally, metadata associated with the data, services and infrastructure functions at the other SANs, such as the third SAN 1574 may be federated with the metadata of the first SAN 1570 and the metadata of the second SAN 1572. In a particular embodiment, information to generate the persistent common view, e.g., a federated metadata database or registry, is stored in one or more of the instances of shared storage. In another particular embodiment, information to generate the persistent common view is stored at a metadata controller associated with one or more of the instances of shared storage.

FIG. 15 illustrates that multiple instances of shared storage architectures may interact while maintaining operational independence. For example, data stored at the second SAN 1572 may be visible and accessible to the first user 1502 via the single view through the virtualized layer 1504 even though the first user 1502 is remote from the second SAN 1572. However, the data at the second SAN 1572 may also be viewed, accessed, used or modified by a user that is local to the second SAN 1572. When changes are made at one of the SANs 1570, 1572, 1574 only metadata that is used to generate the single view through the virtualized layer 1504 (i.e., federated metadata of the SANs 1570, 1572, 1574) may be updated across all of the SANs 1570, 1572, 1574 to make the changes accessible at each of the SANs 1570, 1572, 1574. To illustrate, when data in the second SAN 1572 is modified, the federated metadata used to provide the single view through the virtualized layer 1504 to the first user 1502 is updated at the first SAN 1570. Modifications to the data may or may not be propagated to the first SAN 1570, depending on whether the first SAN 1570 has a copy of the data that was updated. However, the modified data is still available via the first SAN 1570 via the single view through the virtualized layer 1504. Changes to services, infrastructure functions, or both may be treated in a similar manner for certain shared storage architectures.

Figure 16:
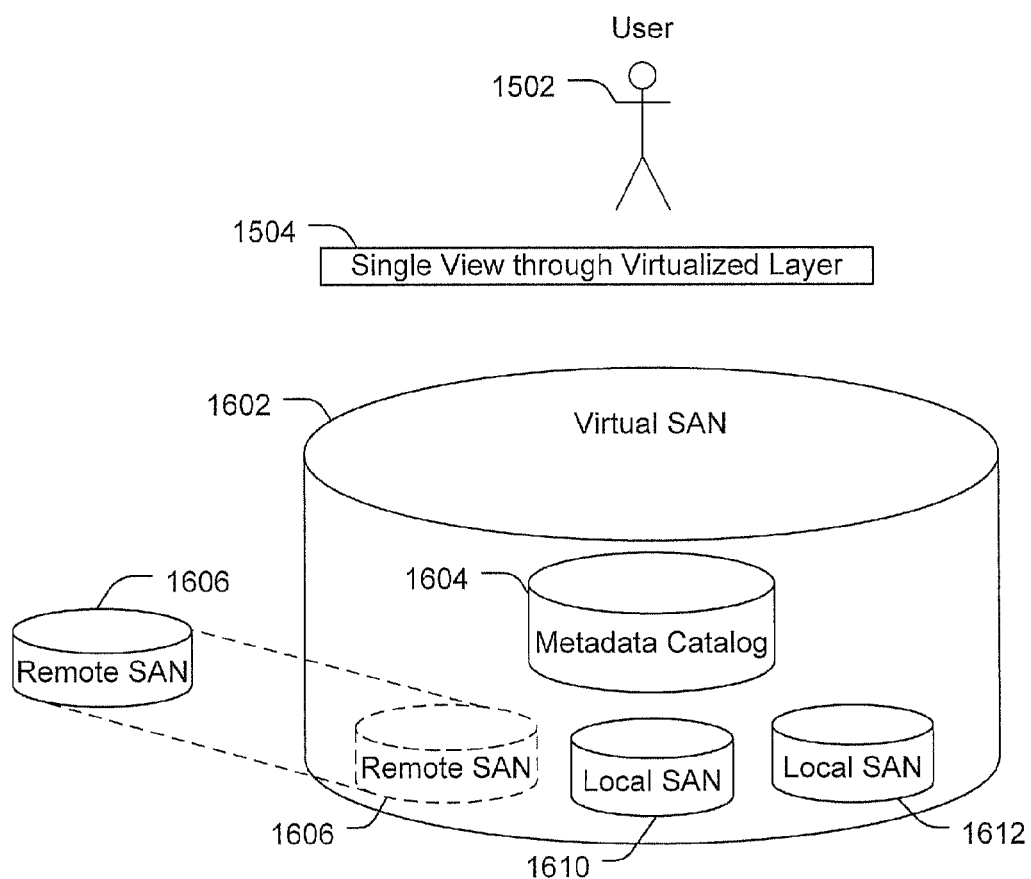
FIG. 16 is a diagram illustrating a virtual shared storage architecture.

FIG. 16 is a diagram illustrating a virtual shared storage architecture. In a particular embodiment, providing the single view through the virtualized layer 1504 of a plurality of shared storage architectures generates a virtual SAN 1602. The virtual SAN 1602 may include a plurality of SANs, such as the first SAN 1570, the second SAN 1572, and the third SAN 1574 of FIG. 15. For example, the virtual SAN 1602 may include a first local SAN 1610 and a second local SAN 1612. The virtual SAN 1602 may also include one or more remote SANs 1606. In a particular embodiment, the remote SAN 1606 may be an ad-hoc SAN. That is, the remote SAN 1606 may be accessible at certain times and inaccessible at other times. To illustrate, the ad-hoc SAN may include one or more ship-based storage devices that are only in communication with the virtual SAN 1602 during a period that the ship is in communication.

The virtual SAN 1602 may include a metadata catalog 1604. The metadata catalog 1604 may be generated by federating metadata associated with each of the SANs of the virtual SAN 1602. Thus, the metadata catalog 1604 may include information related to data stored at the first local SAN 1610, data stored at the second local SAN 1612, data stored at the remote SAN 1606, or data stored across more than one of the SANs. In a particular embodiment, the metadata catalog 1604 may be stored in one or more physical storage devices of the virtual SAN 1602. For example, the metadata catalog 1604 may be stored at one of the SANs of the virtual SAN 1602, at more than one of the SANs of the virtual SAN 1602, or across several of the SANs of the virtual SAN 1602.

The metadata catalog 1604 may be used to provide a persistent common view of the virtual SAN 1602. The metadata catalog 1604 may support the loss of a storage element while maintaining operation and consistency without operator intervention. For example, the metadata catalog 1604 used to provide the persistent common view 1504 of the virtual SAN 1602 may be maintained at the first local SAN 1610. When a communication link is lost to the remote SAN 1606, the metadata catalog 1604 may still be accessible and may enable operation of the virtual SAN 1602 without service interruption. While communication with the remote SAN 1606 is disrupted, requests to access data, services or infrastructure functions that are available on the remote SAN 1606 may be rejected, may be queued for execution when the communication with the remote SAN 1606 is restored, or may be serviced by another SAN that has access to the requested data, services or infrastructure functions (e.g., as a secondary copy). In a particular embodiment, when a shared storage system is added to the virtual SAN 1602 (e.g., when a new SAN is added), metadata related to the new SAN may be automatically added to the metadata catalog 1604. Accordingly, SANs may be added to or removed from the virtual SAN 1602 without disrupting operation of the virtual SAN 1602.

In a particular embodiment, the metadata catalog 1604 may support governance of the virtual SAN 1602 and the SANs within the virtual SAN 1602. For example, the metadata catalog 1604 may enable managing a portfolio of services or infrastructure functions to add new services or infrastructure functions or to update existing services or infrastructure functions. In another example, the metadata catalog 1604 may enable management of services and infrastructure functions lifecycles by ensuring that updates to services and infrastructure functions do not disrupt current consumers of the services or infrastructure functions. In another example, the metadata catalog 1604 uses rules or policies to restrict behavior. To illustrate, rules can be created that apply to selected services, selected infrastructure functions, all services, or all infrastructure functions. In another example, the metadata catalog 1604 may support governance of the virtual SAN 1602 by monitoring performance and availability of services and infrastructure functions. In a particular embodiment, two or more instances of shared storage, such at the first local SAN 1610 and the second local SAN 1612, may have different governance policies. For example, each SAN of the virtual SAN 1602 may enforce different governance policies regarding such things as: computer and data usage, access, outside or remote access, data retention, malware scanning, other governance and control policies, or any combination thereof.

Figure 17:
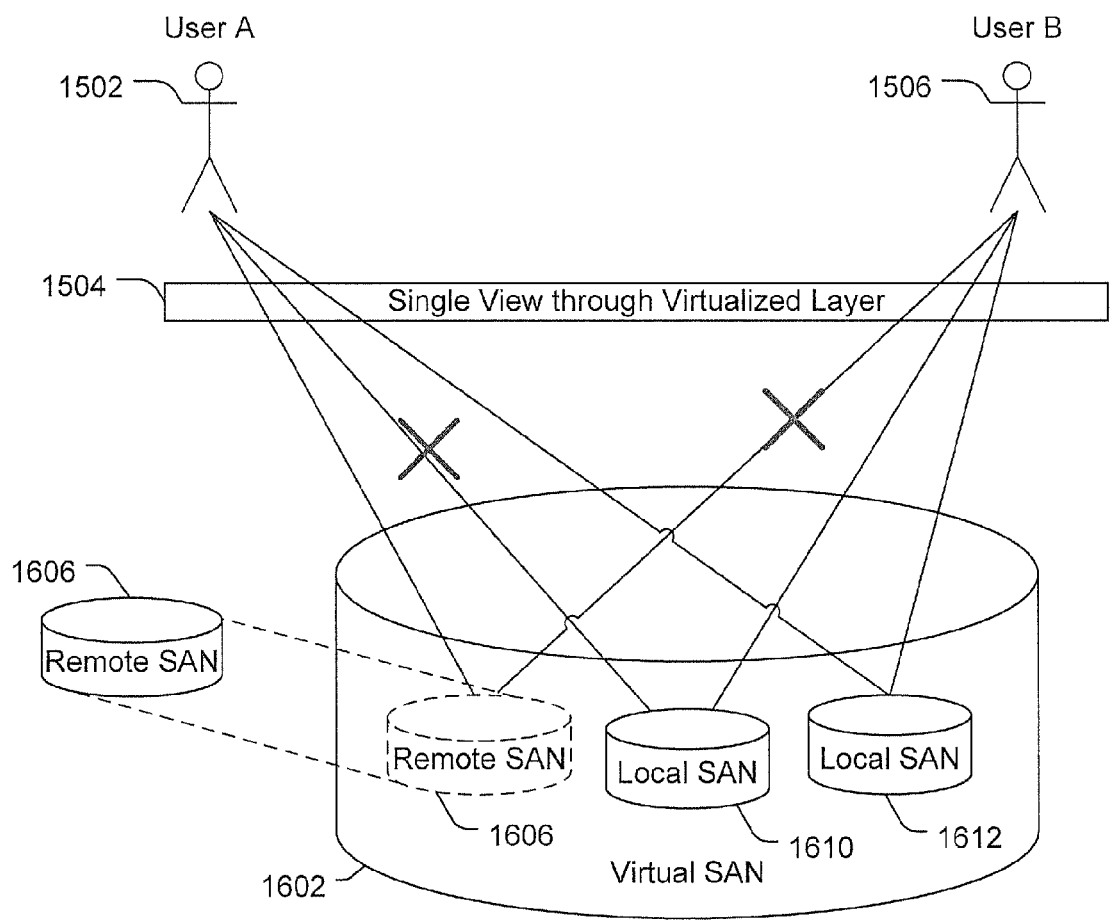
FIG. 17 is a diagram illustrating sharing access policies.

FIG. 17 is a diagram illustrating sharing access policies. In a particular embodiment, the virtual SAN 1602 may restrict access to data, metadata, services, infrastructure functions, and particular storage elements, e.g., physical storage devices or SANs using the single view through the virtualized layer 1504. To illustrate, access to a particular SAN, such as the second local SAN 1612 may be provided to the first user 1502 and to a second user 1506 based on identities of the users 1502, 1506 and based on access rules and policies of the single view through the virtualized layer 1504. The access rules and policies may be enforced by hiding or restricting access to the federated metadata of the virtual SAN 1602 in the single view through the virtualized layer 1504. For example, a metadata controller may enforce the access rules or policies. Access to another particular SAN, such as the first local SAN 1610 may be provided to the second user 1506 but not the first user 1502 based on the identities of the users 1502, 1506 and the access rules and policies.

Figure 18:
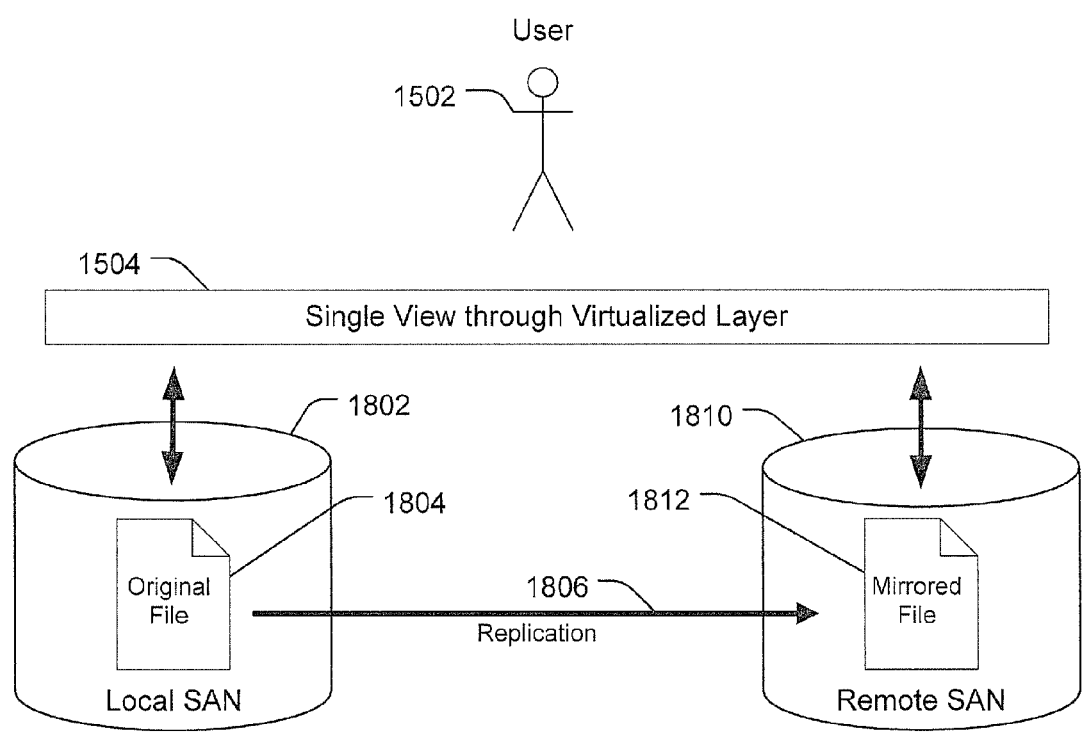
FIG. 18 is a diagram illustrating replicating files across shared storage.

FIG. 18 is a diagram illustrating replicating files across shared storage. In a particular embodiment, files may be replicated across multiple instances of shared storage, e.g., across SANs of a virtual SAN, such as the virtual SAN 1602 of FIG. 16. The files may include data (e.g., user or application data), metadata (e.g., file system metadata), services, infrastructure functions, or any combination thereof. For example, an original file 1804 at a local SAN 1802 may be replicated 1806 to form a mirrored file 1812 at a remote SAN 1810. To illustrate, federated metadata (e.g., metadata that is descriptive of files at two or more SANs) may be synchronized between the SANs. Thus, when data is updated at the local SAN 1802, metadata associated with the data may also be updated. Additionally, data, services or infrastructure functions may be synchronized across two or more SANs. Synchronizing the data, services or infrastructure functions may provide for data integrity. For example, if the original file 1804 is lost or corrupted, the mirrored file 1812 may be used as a backup.

Figure 19:
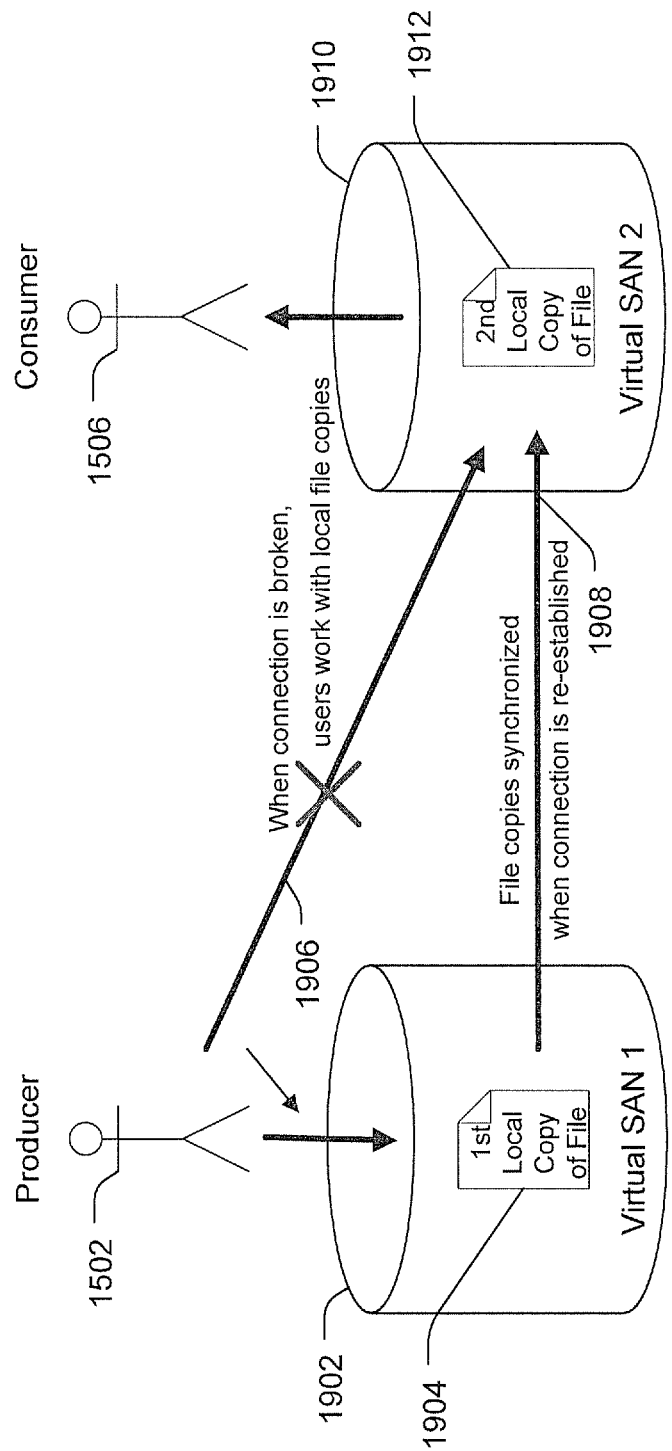
FIG. 19 is a diagram illustrating providing data integrity in a shared storage architecture.

FIG. 19 is a diagram illustrating providing data integrity in a shared storage architecture. In a particular embodiment, a federated metadata catalog of multiple instances of shared storage may be used to enable the multiple instance of shared storage to operate independently, without service interruption, when communication links are interrupted. For example, the first user 1502 may be a producer that produces data, and the second user 1506 may be a consumer that accesses the data. The data generated by the first user 1502 may be saved at a first virtual SAN 1902 in a first local copy of a file 1904. A second local copy of the file 1912 may be saved at a second virtual SAN 1910 as a backup or secondary copy. When a communication connection 1906 between the first user 1502 and the second virtual SAN 1910 is broken, the first user 1502 and the second user 1506 may continue to work on the first and second copies of the files 1904, 1912, respectively. The first and second local copies of the file 1904, 1912 may be synchronized when a communication connection is re-established. Thus, a persistent common view may be automatically maintained at the first virtual SAN 1902 and at the second virtual SAN 1910 when a communication link between the first virtual SAN 1902 and the second virtual SAN 1910 is interrupted.

Figure 20:
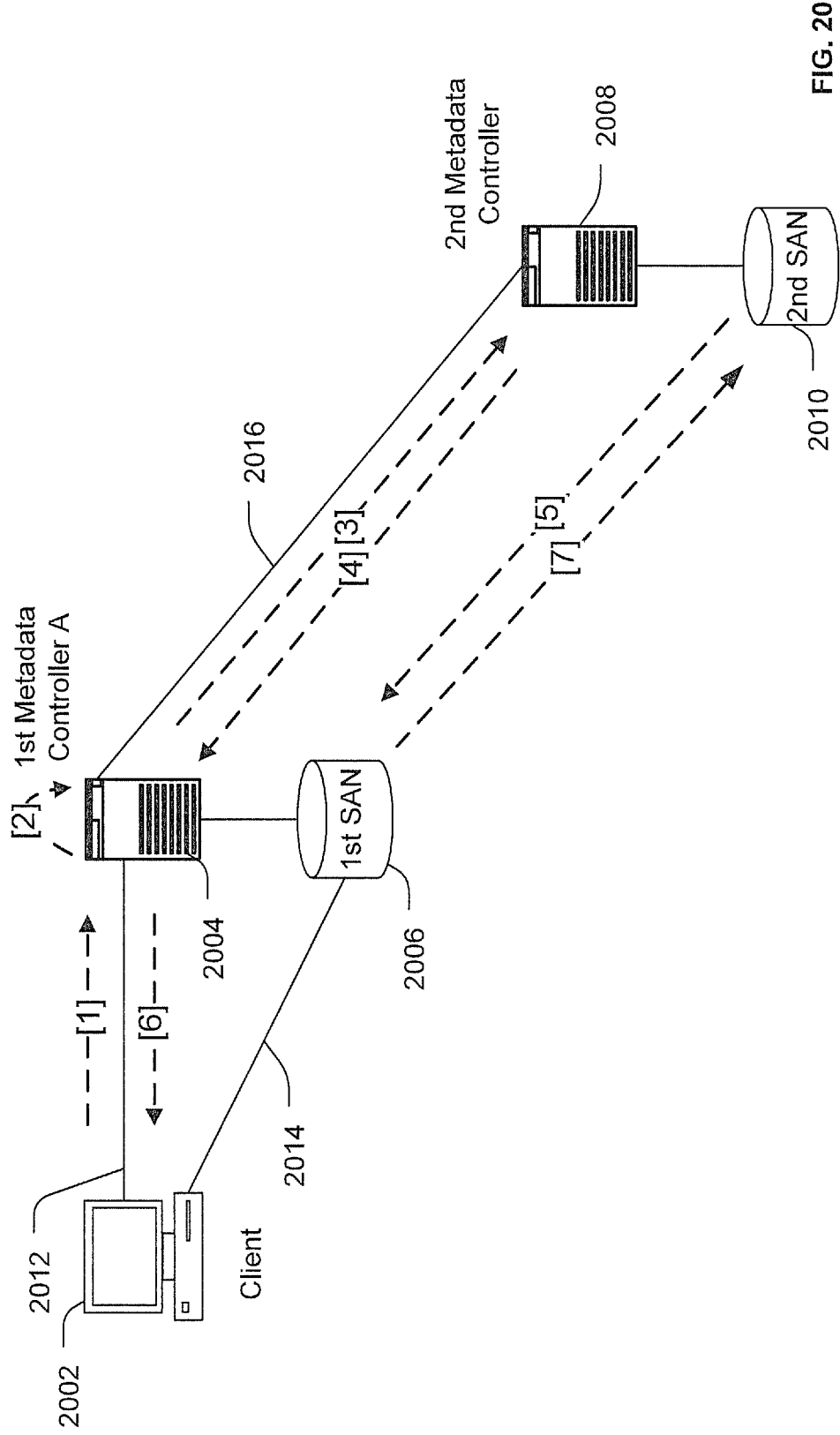
FIG. 20 is a diagram illustrating synchronizing federated metadata.

FIG. 20 is a diagram illustrating synchronizing federated metadata. In a particular embodiment, a client 2002 has a communication link 2012 to a first metadata controller 2004 associated with a first SAN 2006 of a shared storage architecture. The first metadata controller 2004 may also have a communication connection 2016 to a second metadata controller 2008 associated with a second SAN 2010. At arrow 1, the client 2002 sends a request for a file system object to the first metadata controller 2004. At arrow 2, the first metadata controller 2004 attempts to satisfy a file system request using information available in the first SAN 2006. For example. The first metadata controller 2004 may search metadata associated with the first SAN 2006 to determine whether the file system object refers to data, services or infrastructure functions available at the first SAN 2006. If the first SAN 2006 does not have the information requested, the first metadata controller 2004 may send a query to one or more other metadata controllers, such as to the second metadata controller 2008, at arrow 3. At arrow 4, the second metadata controller 2008 answers the query from the first metadata controller 2004. At arrow 5, the requested information may be replicated from the second SAN 2010 to the first SAN 2006. The first metadata controller 2004 may update metadata associated with the first SAN 2006 to indicate that the replicated data is available at the first SAN 2006. At arrow 6, the first metadata controller 2004 sends metadata, such as information specifying a storage location of the requested data, to the client 2002. The client 2002 accesses the data from the first SAN 2006 and updates or modifies the data. At arrow 7, the updates are synchronized between the first SAN 2006 and the second SAN 2010.

Figure 21:
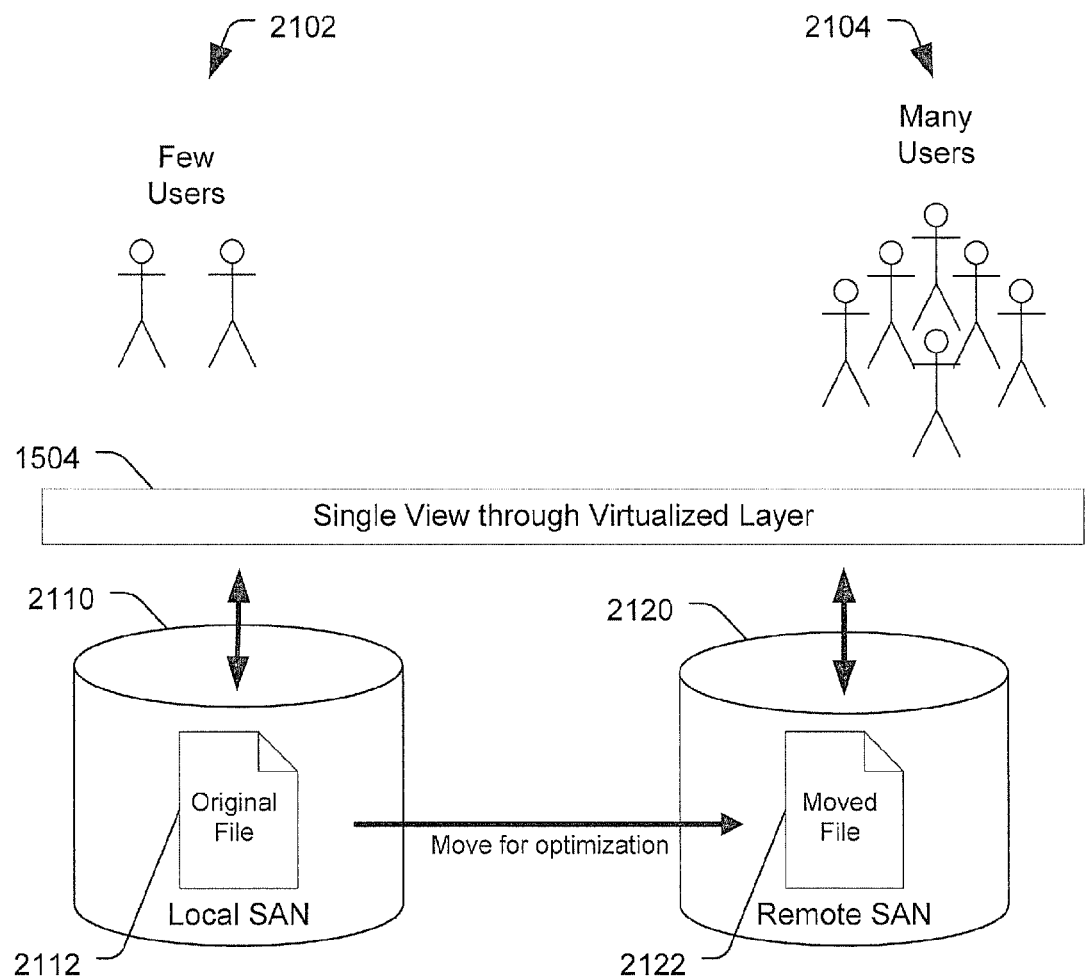
FIG. 21 is a diagram illustrating relocating one or more of files, file systems and services.

FIG. 21 is a diagram illustrating relocating one or more of files, file systems and services. In a particular embodiment, an original file 2112 of a shared storage architecture may be located at a first SAN 2110 that is local to a first set of users 2102. A second set of users 2104 may access and view the original file 2112 via the single view through the virtualized layer 1504 while the original file 2112 is stored at the first SAN 2110. When it is determined that performance of the shared storage architecture can be improved by moving the original file 2112 closer to the second set of users 2104, such as to a second SAN 2120 that is remote from the local SAN 2110, the original file 2112 may be relocated to the second SAN 2120 as a moved file 2122. For example, the original file 2112 may be relocated to optimize or improve performance for the second set of users 2104, the first set of users 2102, or both. To illustrate, when the second set of users 2104 includes more users that access the file 2112 than the first set of users 2012, the file 2112 may be relocated to be nearer to the second set of users 2104. The original file 2112 may include data, metadata, services, infrastructure functions, or any combination thereof.

Figure 22:
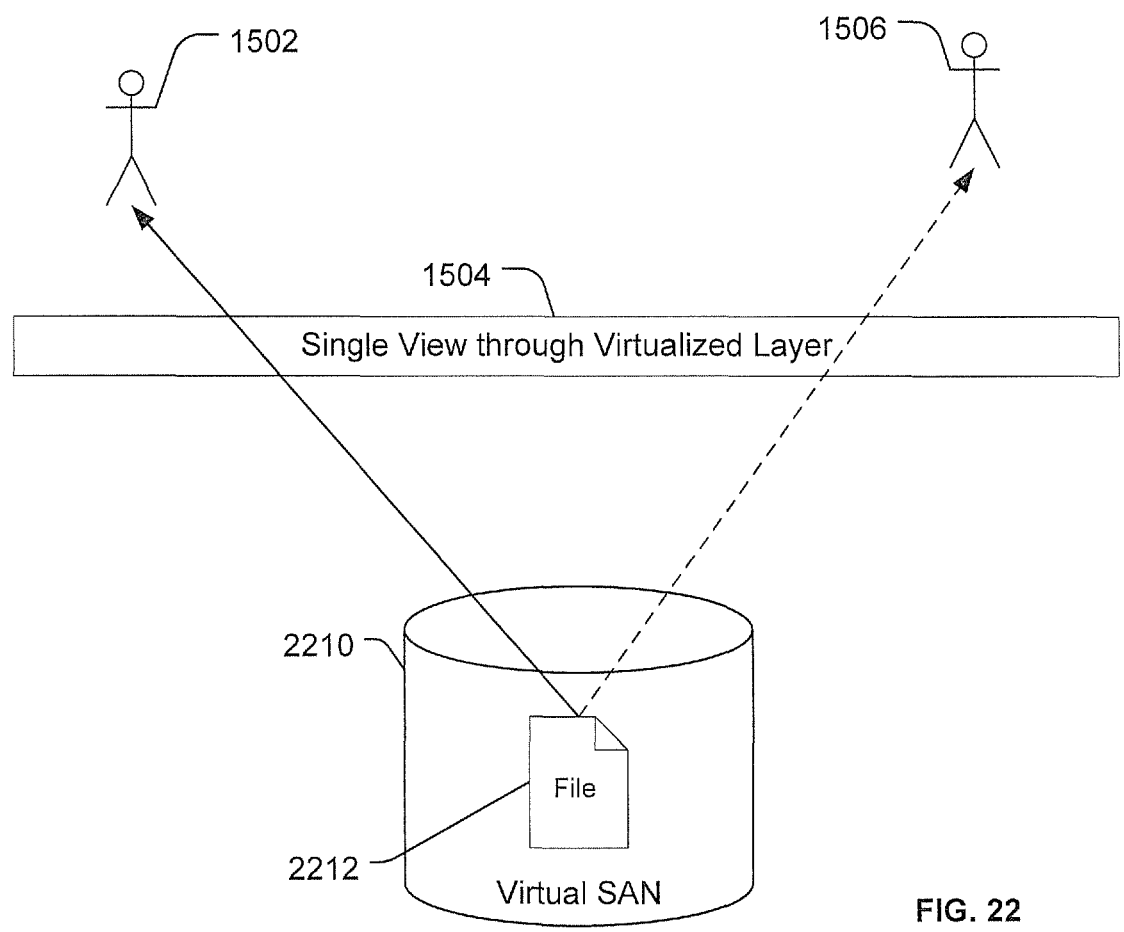
FIG. 22 is a diagram illustrating providing file access in a shared storage architecture.

FIG. 22 is a diagram illustrating providing file access in a shared storage architecture. In a particular embodiment, the first user 1502 may have access to a file 2212 in shared storage 2210, such as in the virtual SAN 1602 of FIG. 16, via a high availability, high bandwidth connection. A second user 1506 may have access to the file 2212 via a lower availability (e.g., standard availability), or lower bandwidth (e.g., standard bandwidth) connection. The shared storage architecture provided enables meeting quality of service targets for both the first user 1502 and the second user 1506. For example, the single view through the virtualized layer 1504 may prioritize services based on quality of service to meet the quality of service targets of each of the users 1502, 1506.

In another particular embodiment, the first user 1504 may have local access to the file 2212 and the second user 1506 may have remote access to the file 2212. The single view through the virtualized layer 1504 may support proxying to enable non-direct access clients (i.e., the second user 1506) to access shared storage of the shared storage architecture.

Figure 23:
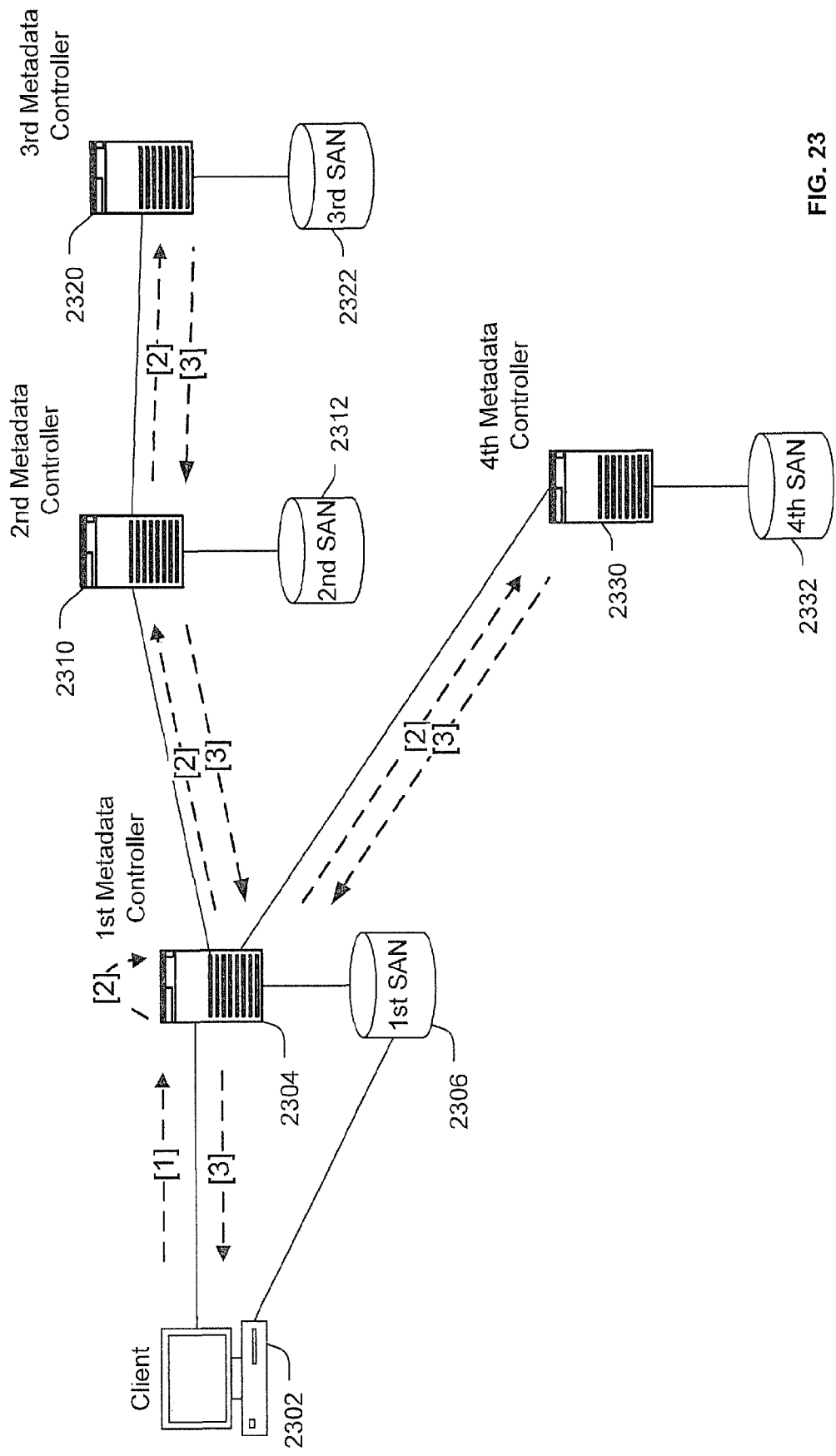
FIG. 23 is a diagram illustrating maintaining trust relationships between elements of a shared storage system.

FIG. 23 is a diagram illustrating maintaining trust relationships between elements of a shared storage system. In a particular embodiment, elements of a shared storage architecture may only share metadata with verified sources. Accordingly, trust relationships or certificates may be used to federate metadata across the shared storage architecture. For example, a client 2302 may be in communication with a first metadata controller 2304. The first metadata controller 2304 may be coupled to a second metadata controller 2310 and a fourth metadata controller 2330. The second metadata controller 2310 may be coupled to a third metadata controller 2320. Each of the first, second, third and fourth metadata controllers 2304, 2310, 2320, 2330 may be coupled to a respective SAN 2306, 2312, 2322, 2332. When the client 2302 sends a request to the first metadata controller 2304, at arrow 1, the client 2302 may send a certificate including authentication information. At arrow 2, the first metadata controller 2304 may validate the certificate from the client 2302. The first metadata controller 2304 may also send the certificate from the client 2302 to the other metadata controllers 2310, 2320, 2330 or may send a certificate associated with the first metadata controller 2304 to the other metadata controllers 2310, 2320, 2330. At arrow 3, validated user request responses may be sent between the metadata controllers 2304, 2310, 2320, 2330 and the client 2302.

Figure 24:
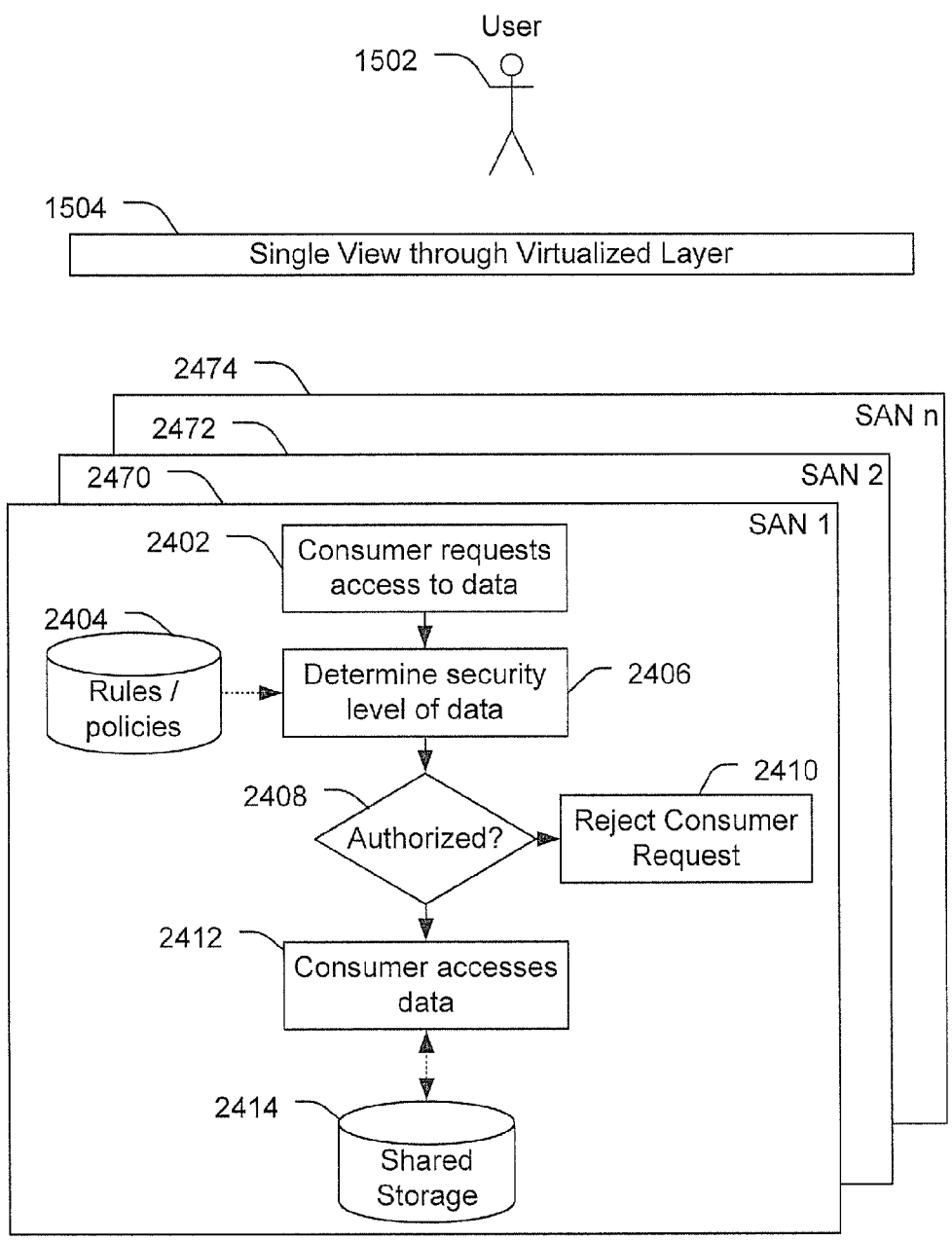
FIG. 24 is a diagram illustrating restricting access to information using rules or policies.

FIG. 24 is a diagram illustrating restricting access to information using rules or policies. In a particular embodiment, access to data, metadata, services or infrastructure functions of a shared storage architecture may be restricted based on an access level (or security level) of a data consumer using a virtualization layer. Access level may refer to a set of user permissions whereas security level may refer to authority to access or utilize particular information. To illustrate, access level may refer to whether a person can read or write to a particular file. Security level may refer, for example, to the person's security clearance or need to know particular information.

In a particular embodiment of a shared storage architecture, a consumer may request access to data, at 2402. Rules, policies, or both 2404 may be used to determine an access level or security level associated with the data, at 2406. A determination may be made, at 2408, of whether the consumer is authorized to access the data. When the consumer is not authorized to access the data, the request may be rejected, at 2410. When the consumer is authorized to access the data, the consumer may be provided access to the data, at 2412, via shared storage 2414.

In a particular embodiment, the single view through the virtualized layer 1504 may include federated metadata of a plurality of SANs, such as a first SAN 2470, a second SAN 2472, and one or more third SANs 2474. Each of the SANs 2470, 2472, 2474 may include one or more instances of shared storage. By restricting access to the single view through the virtualized layer 1504, access to data within each of the SANs 2470, 2472, 2474 can be restricted. For example, the rules or policies 2404 may be implemented by a metadata controller to restrict access to federated metadata associated with the SANs 2470, 2472, 2474.

Figure 25:
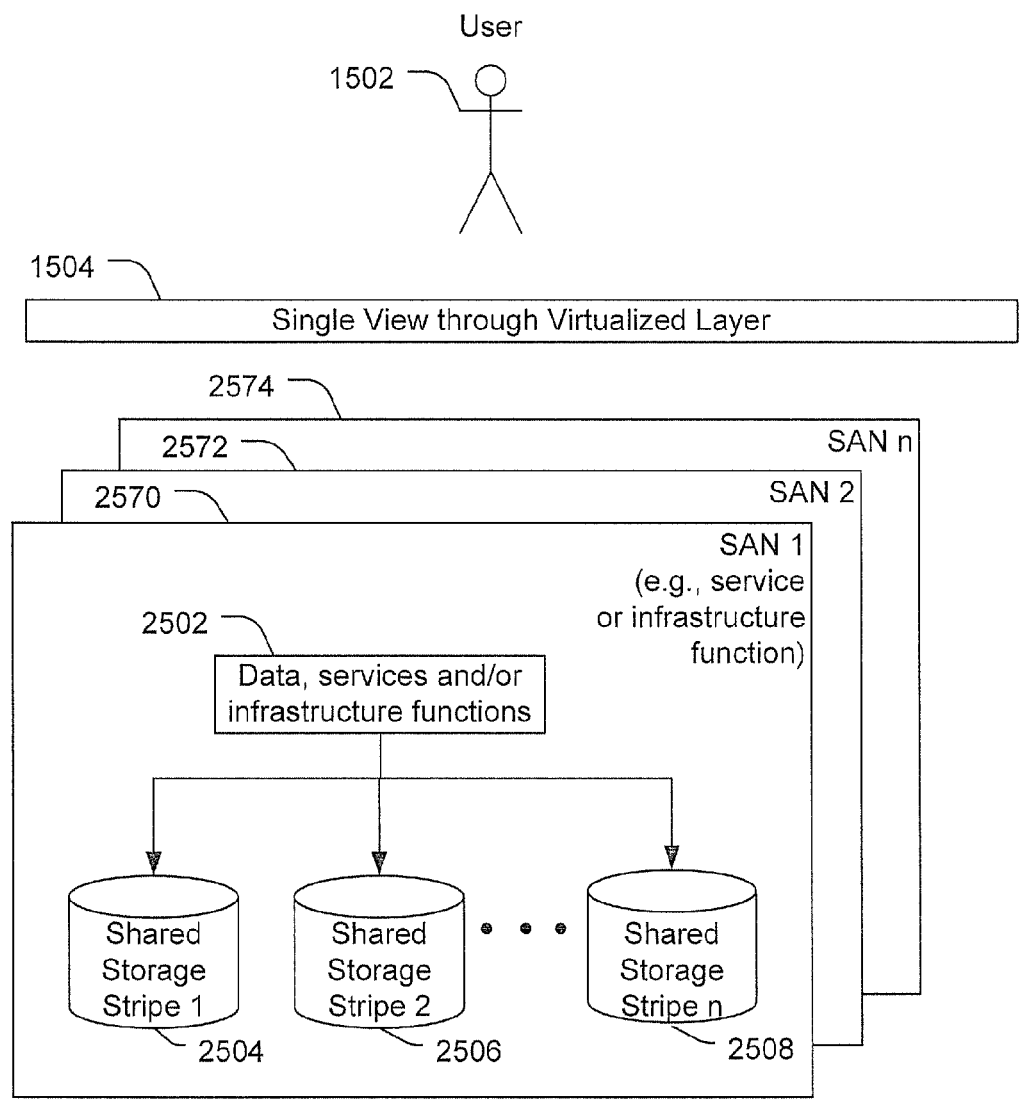
FIG. 25 is a diagram illustrating striping data across a shared storage system.

FIG. 25 is a diagram illustrating striping data across a shared storage system. In a particular embodiment of a shared storage architecture, a shared storage system may include a plurality of physical storage devices, such as a first shared storage device 2504, a second shared storage device 2506, and one or more third shared storage devices 2508. Data, services or infrastructure functions may be striped across the plurality of storage devices of a shared storage system to improve access times and performance speeds of the services or the infrastructure functions provided over the shared storage. To illustrate, performance speed of a service in a services over shared storage system may be increased by striping instructions to implement the service across the first shared storage device 2504, the second shared storage device 2506, and the one or more third shared storage devices 2508. In another illustrative example, performance speed of an infrastructure function in an ESB over shared storage system may be increased by striping instructions to implement the infrastructure function across the first shared storage device 2504, the second shared storage device 2506, and the one or more third shared storage devices 2508.

In a particular embodiment, the single view through the virtualized layer 1504 may include metadata that includes information to reconstruct the instructions from instruction data striped across the shared storage to implement the service. Additionally, the single view through the virtualized layer 1504 may include federated metadata of data, services and infrastructure functions stored at multiple instances of shared storage, such as a first SAN 2570, a second SAN 2572 and one or more third SANs 2574.

Figure 26:
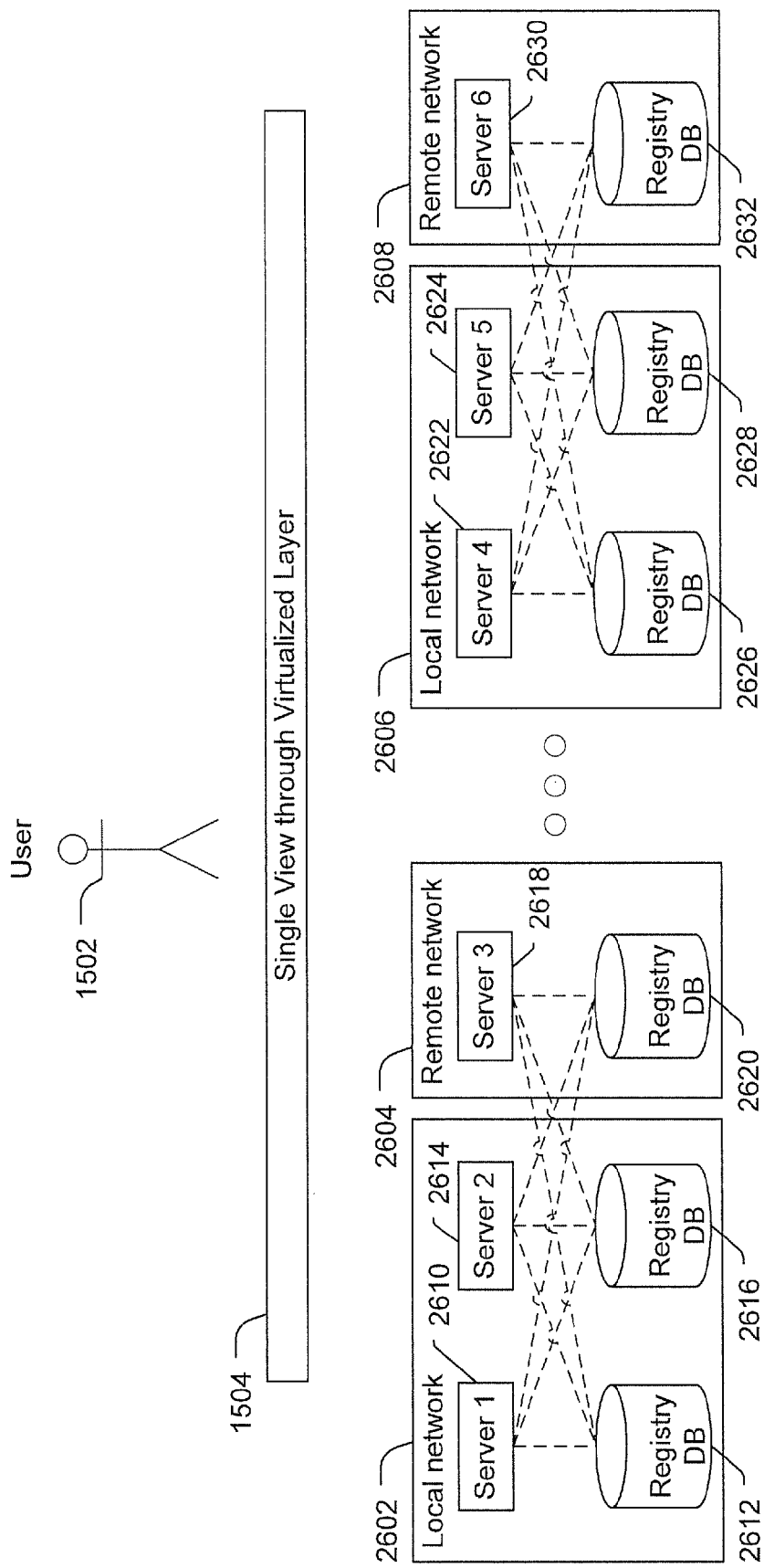
FIG. 26 is a diagram illustrating federating data, services and infrastructure functions in shared storage system with another shared storage system.

FIG. 26 is a diagram illustrating federating data, services and infrastructure functions in a shared storage system with another shared storage system. For example, metadata of a plurality of registry databases 2612, 2616, 2620 of a first virtual SAN that includes a first local network 2602 and a first remote network 2604 may be federated with metadata of a plurality of registry databases 2626, 2628, 2632 of a second virtual SAN that includes a second local network 2606 and a second remote network 2608 via communications between a plurality of servers 2610, 2614, 2618, 2622, 2624, 2630 of the virtual SANs. The single view through the virtualized layer 1504 may include or provide access to the federated metadata.

Figure 27:
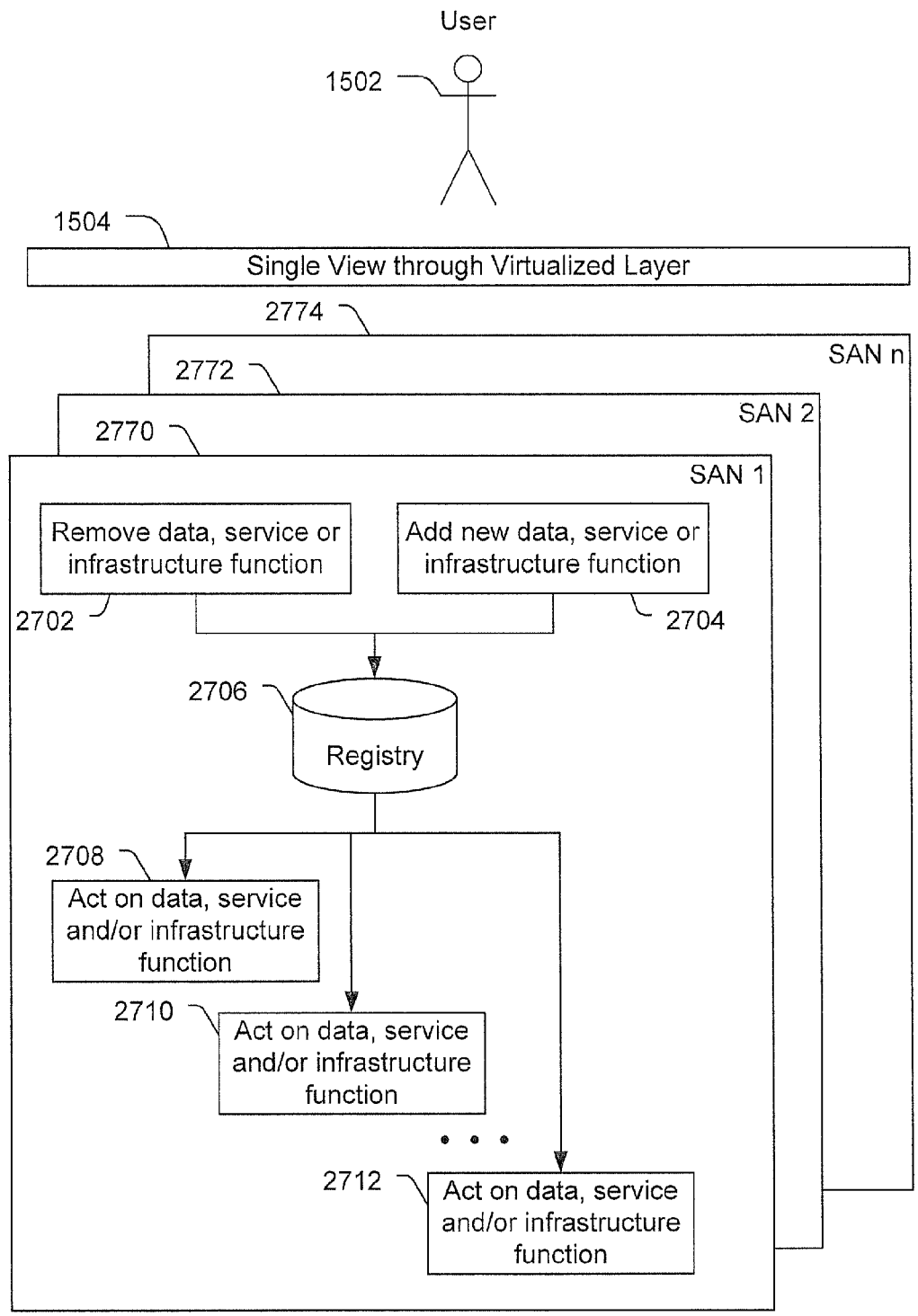
FIG. 27 is a diagram illustrating independently adding, removing and using data, services or infrastructure functions in a shared storage architecture.

FIG. 27 is a diagram illustrating independently adding, removing and using data, services or infrastructure functions in a shared storage architecture. In a particular embodiment, data, services, infrastructure functions, or any combination thereof can be added, removed, or acted upon independent of time in a shared storage architecture. For example, at 2702, data, a service or an infrastructure function may be removed from a registry 2706 at a first SAN 2770. The registry 2706 may include or be included within metadata of the first SAN 2770. At 2704, new data, a new service or a new infrastructure function can be added to the registry 2706. At 2708, 2710, 2712, the data, services and infrastructure functions identified in the registry 2706 can be acted upon (e.g., executed) independently of one another and at any time or in any order (i.e., independent of time).

In a particular embodiment, the registry 2706 may be federated with registries of other SANs, such as a second. SAN 2772 and one or more third SANs 2774. In this embodiment, the data, services and infrastructure functions in each of the SANs 2770, 2772, 2774 can be added, removed and acted upon independently of one another and at any time. The single view through the virtualized layer 1504 may be provided using the federated registries. For example, the single view through the virtualized layer 1504 may include federated metadata associated with the data, services and infrastructure functions hosted by the shared storage 2808 of each of the SANs 2870, 2872, 2874. Federating the metadata of the SANs 2770, 2772, 2774 does not limit independent operation of or access to the data, services or infrastructure functions of the SANs 2770, 2772, 2774.

Figure 28:
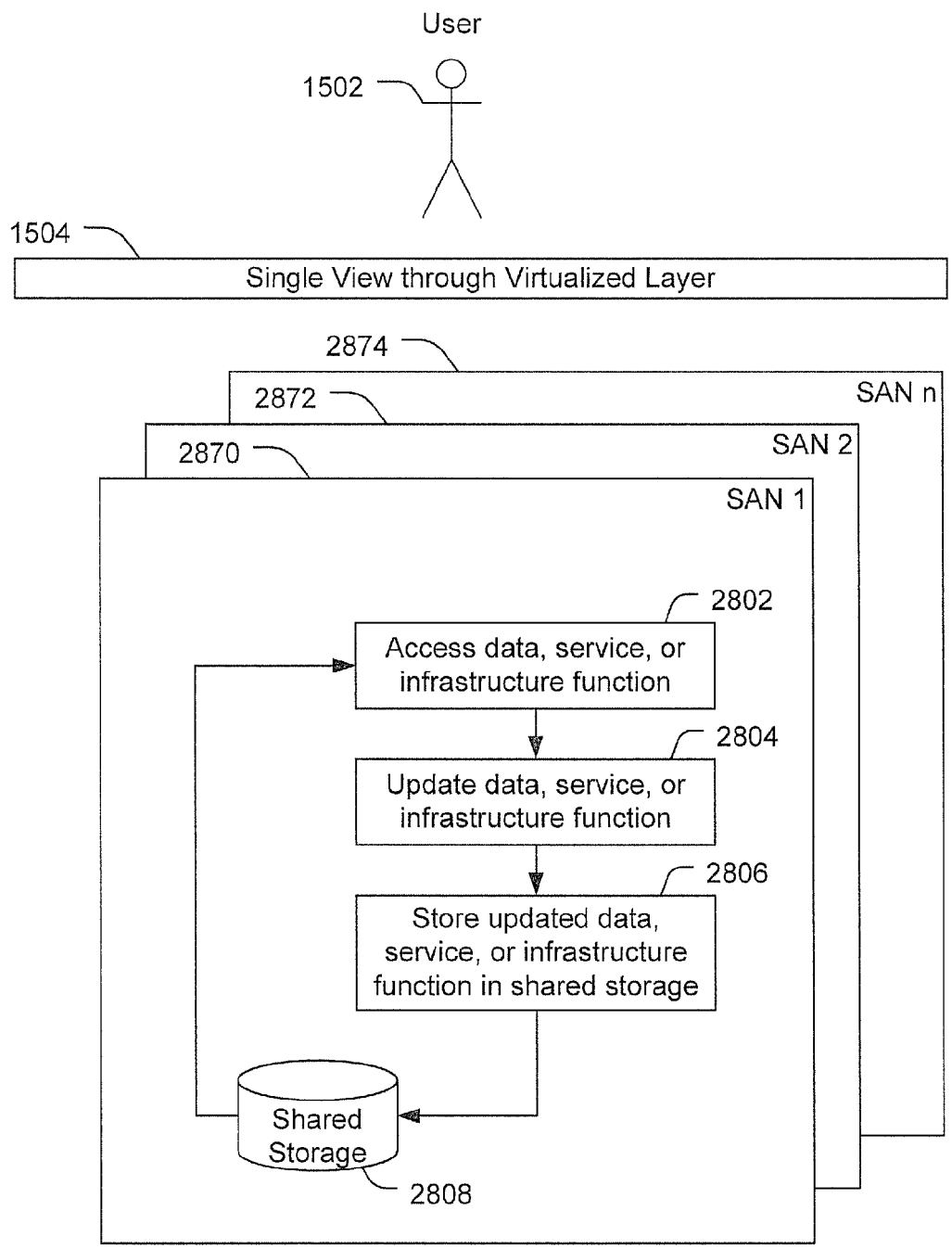
FIG. 28 is a diagram illustrating modifying data, services and infrastructure functions in a shared storage architecture.

FIG. 28 is a diagram illustrating modifying data, services and infrastructure functions in a shared storage architecture. In a particular embodiment, data, services, infrastructure functions, or any combination thereof can be updated or modified over shared storage independent of time. For example, at 2802, data, a service or an infrastructure function can be accessed from shared storage 2808 at a first SAN 2870. At 2804, the accessed data, service or infrastructure function can be updated. At 2806, the updated data, service or infrastructure function can be stored in the shared storage 2808. Data, services or infrastructure functions at other SANs, such as a second SAN 2872 and one or more third SANs 2874, can also be updated or modified independently of one another and at any time. The single view through the virtualized layer 1504 may be provided using federated metadata associated with the data, services or infrastructure functions at each of the SANs 2870, 2872, 2874. Federating the metadata of the SANs 2770, 2772, 2774 does not limit the capability of independently updating or modifying the data, services or infrastructure functions of the SANs 2770, 2772, 2774.

Figure 29:
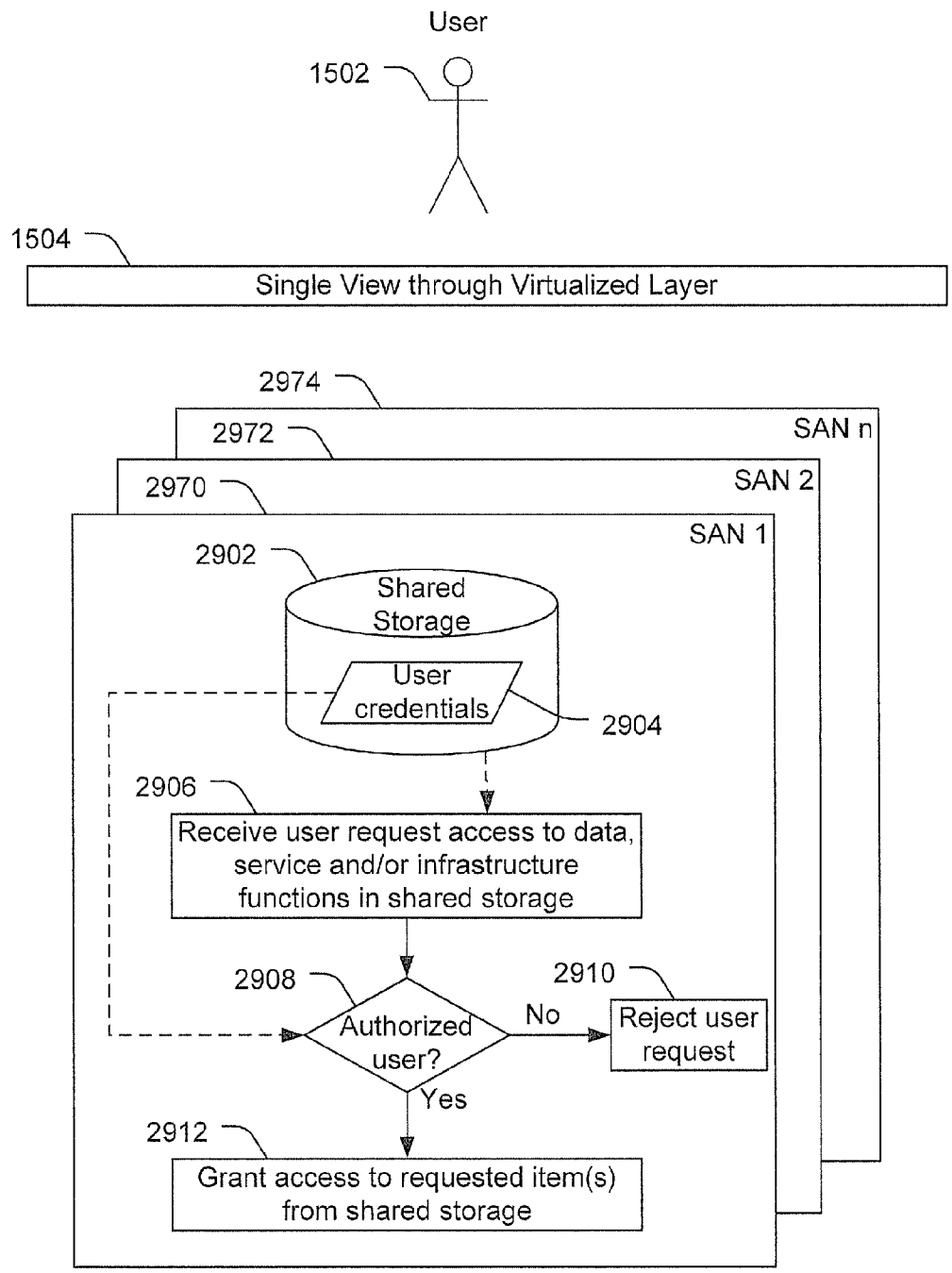
FIG. 29 is a diagram illustrating hiding or restricting access in a shared storage architecture.

FIG. 29 is a diagram illustrating hiding or restricting access in a shared storage architecture. In a particular embodiment, access to files in shared storage 2902 can be restricted based on user credentials 2904. Alternately, or in addition, the files can be hidden or made visible based on the user credentials 2904. For example, at 2906, a user request to access an item in the shared storage 2902 can be received. The requested item may be data, metadata, a service, an infrastructure function, or any combination thereof. A determination may be made, at 2908, whether the user is authorized to access the item. If the user is not authorized to access the item, the request is rejected, at 2910. If the user is authorized to access the item, access to the requested item may be granted, at 2912.

Access to data, metadata, services or infrastructure functions at other SANs, such as a second SAN 2972 and one or more third SANs 2974, can also be restricted or hidden. The single view through the virtualized layer 1504 may be provided using federated metadata associated with the data, services or infrastructure functions hosted at each of the SANs 2970, 2972, 2974. Data, metadata, services, infrastructure functions, or any combination thereof from each of the SANs 2970, 2972, 2974 can be hidden or restricted through controlled access to federated metadata of a federated shared storage architecture.

Figure 30:
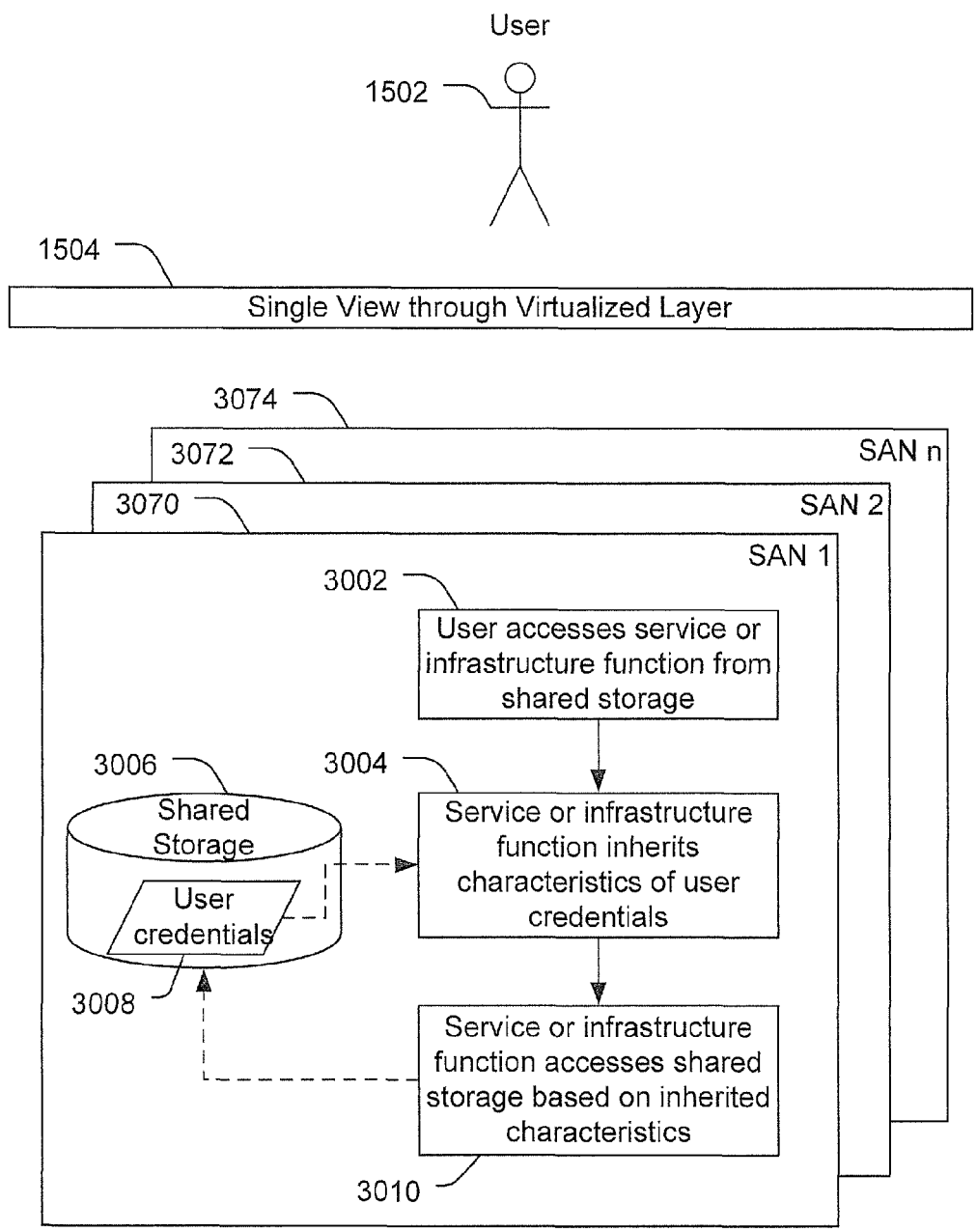
FIG. 30 is a diagram illustrating a service or infrastructure function inheriting an identity and/or security level of a consumer in a shared storage architecture.

FIG. 30 is a diagram illustrating a service or infrastructure function inheriting an identity and/or security level of a consumer in a shared storage architecture. In a particular embodiment, services and infrastructure functions provided via shared storage may inherit or take on attributes of a requestor that caused the service or infrastructure function to be implemented. For example, a service or infrastructure function may inherit an identity of the requestor, a security level of the requestor, an access level of the requestor, or an identity attribute of the requestor that is associated with the requestor's security level or access level. For example, when a requestor causes a particular file to be accessed, the particular file may inherit at least one identity attribute of the requestor that is associated with a security level of the requestor. To illustrate, at 3002, a user may access a service or infrastructure function from shared storage 3006. At 3004, the service or infrastructure function inherits characteristics of user credentials 3008 of the user. At 3010, the service or infrastructure function can access the shared storage 3006 based on the inherited characteristics. For example, the service or infrastructure function may be authorized to access data that the user would be authorized to access directly. In another example, the service or infrastructure function may be restricted from accessing data that the user would not be authorized to access.

In a federated shared storage architecture, the service or infrastructure function may also be able to access data, metadata, services or infrastructure functions at other SANs, such as a second SAN 3072 and one or more third SANs 3074, based on the inherited characteristics. The single view through the virtualized layer 1504 may be provided using federated metadata associated with the data, services or infrastructure functions at each of the SANs 3070, 3072, 3074. Data, metadata, services, infrastructure functions, or any combination thereof from each of the SANs 3070, 3072, 3074 can be hidden or restricted from the service or infrastructure function implemented by the user based on the inherited characteristics using controlled access to federated metadata.

Figure 31:
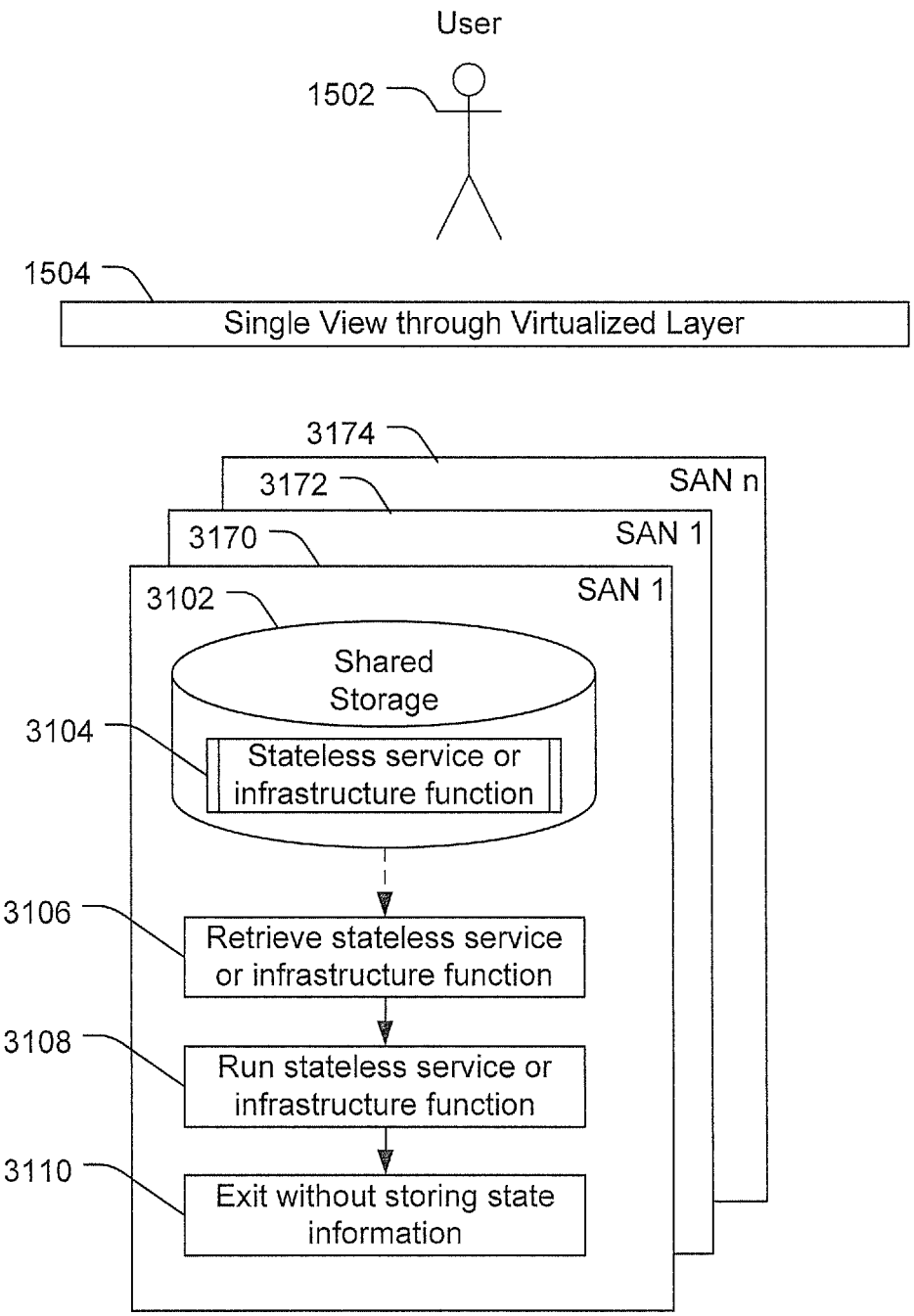
FIG. 31 is a diagram illustrating stateless services and infrastructure functions in a shared storage architecture.

FIG. 31 is a diagram illustrating stateless services and infrastructure functions in a shared storage architecture. In a particular embodiment, services, infrastructure functions, or both, hosted on shared storage 3102 are stateless. A stateless service may not retain information in the shared storage 3102 after use. Similarly, a stateless infrastructure function may not retain information in the shared storage 3102 after use. For example, a stateless service or infrastructure function 3104 may not retain information regarding usage, a current state, and a security level of a requestor, an access level of the requestor, or any combination thereof, after use. To illustrate, at 3106, the stateless service or infrastructure function 3104 is retrieved from the shared storage 3102. For example, the stateless service or infrastructure function 3104 may be retrieved by a server or a client. At 3108, the server or client may run the stateless service or infrastructure function 3104. At 3110, the server or client may exit (or terminate) the stateless service or infrastructure function 3104 without storing state information regarding the stateless service or infrastructure function 3104 in the shared storage 3102.

In a particular embodiment, retrieving the stateless service or infrastructure function 3104 from the shared storage 3102 and running the stateless service or infrastructure function 3104 at a client or server may be referred to as generating an instance of the service or infrastructure function. To illustrate, instructions to implement a service may be stored in the shared storage 3102. The instructions to implement the service may be retrieved from the shared storage 3102 using metadata associated with the shared storage 3102 that includes storage location information of the instructions. When the instructions are encoded in the shared storage 3102, the metadata may also include decryption keys. Thus, the metadata provides information that is used by the client to reconstruct an executable instance of the service. As described with reference to FIG. 30, the instance of the service may inherit characteristics of the user, such as security level or access level of the user. When the client is done using the instance of the service, the instance of the service may be terminated and deleted. That is, the instance of the service is not retained, although the instructions to generate a new instance of the service remain in the shared storage 3102 and are not affected by the client generating the instance of the service.

In a federated shared storage architecture, the stateless service or infrastructure function 3104 may also be accessible to users of other SANs, such as a second SAN 3172 and one or more third SANs 3174. For example, the single view through the virtualized layer 1504 may be provided using federated metadata that includes information regarding the stateless service or infrastructure function 3104.

Figure 32:
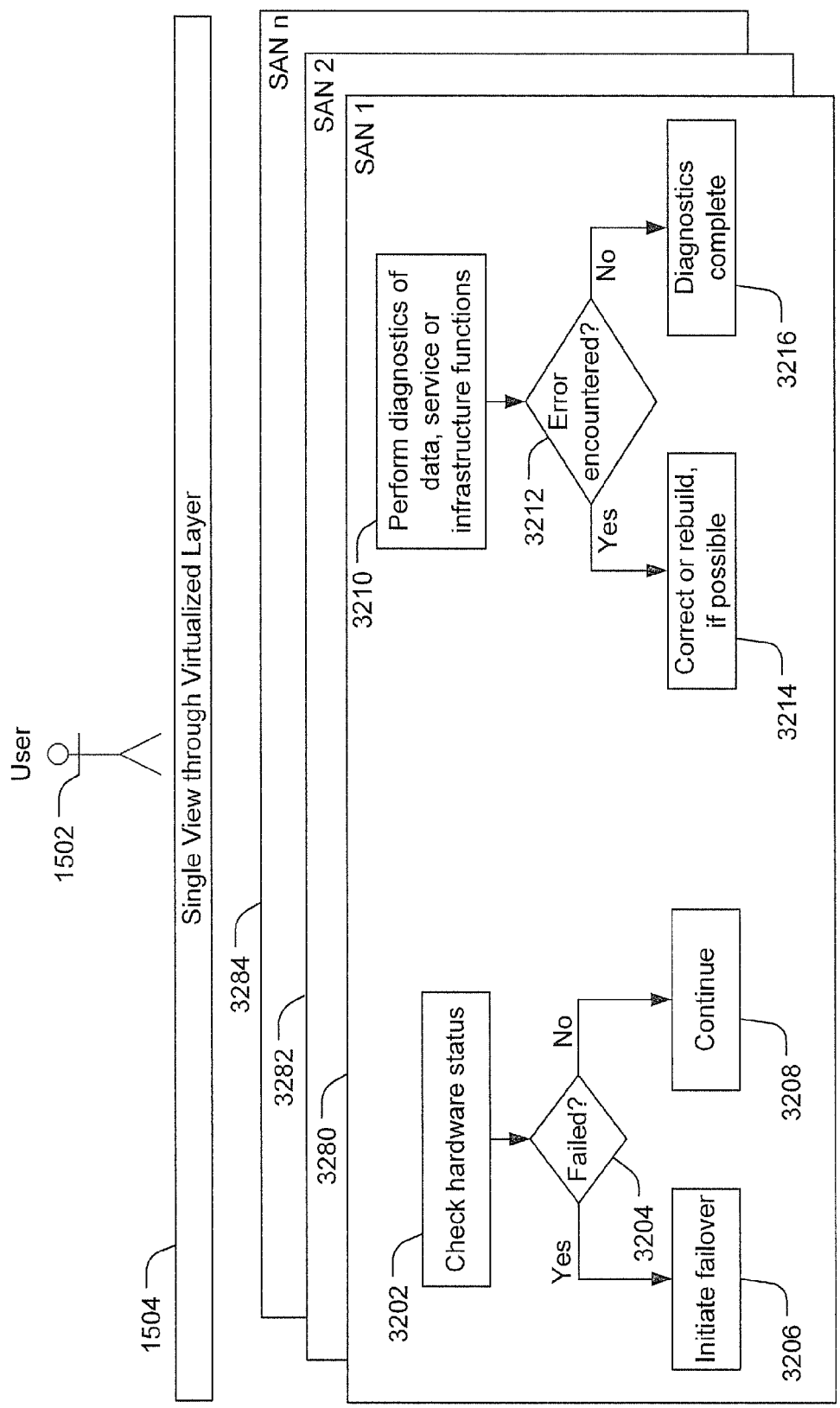
FIG. 32 is a diagram illustrating diagnostics in a shared storage architecture.

FIG. 32 is a diagram illustrating diagnostics in a shared storage architecture. In a particular embodiment, the shared storage architecture may support diagnostics and monitoring status of hardware elements (e.g., servers, metadata controllers, physical storage devices, etc.) and of data elements, (e.g., data, metadata, services and infrastructure functions). For example, at 3202, a hardware status check of a hardware element of a shared storage system of a first SAN 3280 may be performed. The hardware status check may determine whether the hardware element has failed, at 3204. When the hardware element has not failed, operation of the first SAN 3280 may continue, at 3208. To illustrate, the first SAN 3280 may perform another hardware status check of another hardware element. Hardware elements of the first SAN 3280 may be checked periodically, according to a schedule, or in response to an external stimulus, such as a user request. When the hardware element has failed, a failover process may be initiated, at 3206. The failover process may cause shared storage of the first SAN 3280 to be automatically reconfigured. For example, the shared storage may be reconfigured to bypass the failed hardware element. In another example, the shared storage may be reconfigured to utilize a backup hardware element to replace the failed hardware element.

In a particular embodiment, at 3210, diagnostics may be performed of data, services, infrastructure functions, or any combination thereof, of the first SAN 3280. A determination may be made, at 3212, of whether an error has been encountered. For example, an error may be detected using parity or other error detection information. When no error is detected, the diagnostics may be complete, at 3216. When an error is detected, the error is corrected or the data is rebuilt if possible, at 3214. For example, error correction information may be used to correct the error to recover the faulted data. Alternately, backup or secondary copies of the data may be used to rebuild the data to recover the faulted data.

In a federated shared storage architecture, hardware elements and data elements of multiple instances of shared storage may be checked independently. For example, a second SAN 3282 and one or more third SANs 3284 may perform diagnostics and status checks of hardware and data elements of the second SAN 3282 and the third SAN 3284, respectively. When faulted data or failed hardware elements are detected, federated metadata of the federated shared storage architecture may be updated to reflect corrective actions taken in response to the faulted data or failed hardware element. For example, the second SAN 3282 may be reconfigured as a result of a failed hardware element, and the federated metadata may be updated to avoid sending requests to the failed hardware element.

Figure 33:
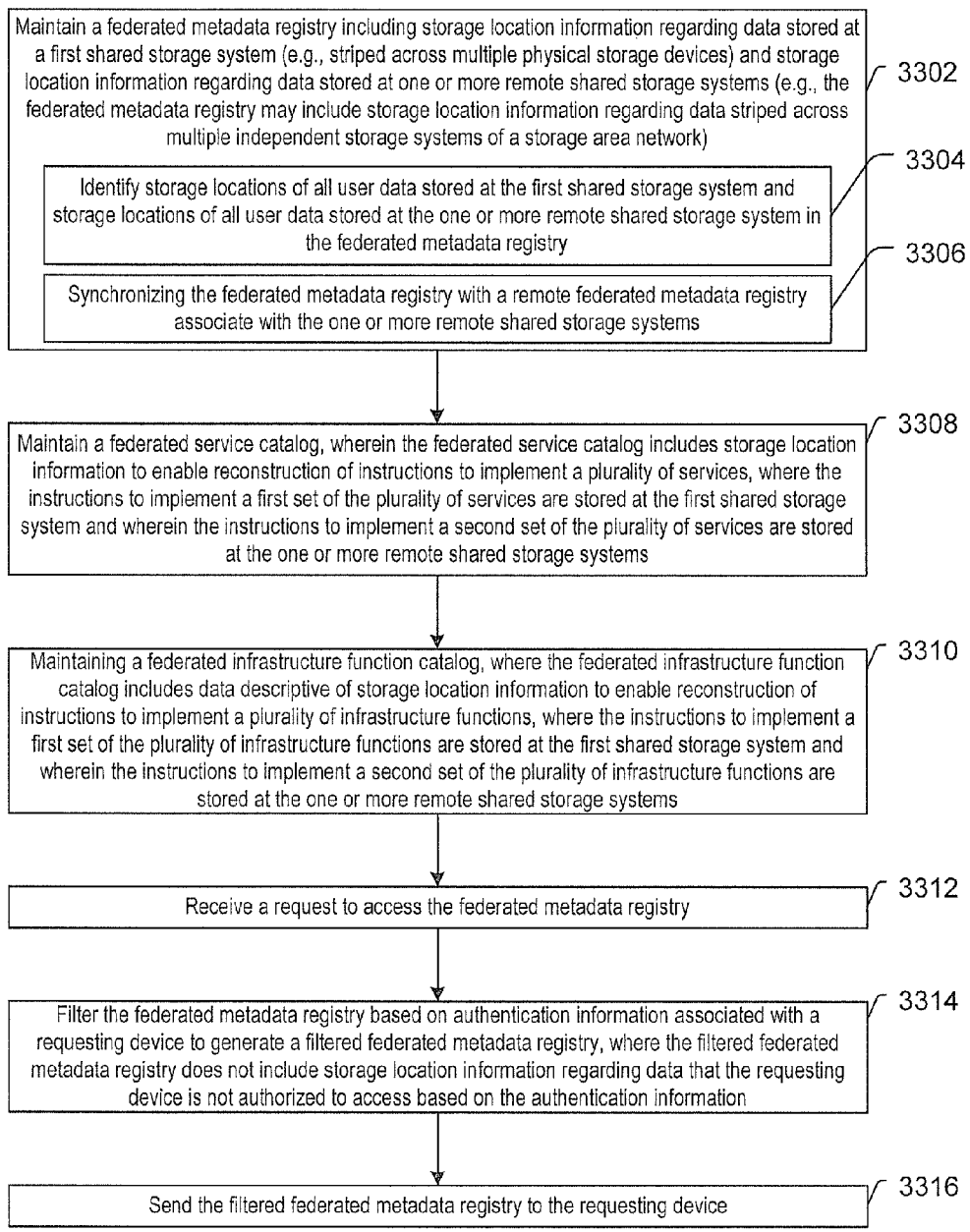
FIG. 33 is a flow chart illustrating a method of providing a federated shared storage system.

FIG. 33 is a flow chart illustrating a method of providing a federated shared storage system. The method includes, at 3302, maintaining a federated metadata registry including storage location information regarding data stored at a first shared storage system and storage location information regarding data stored at one or more remote shared storage systems. In an illustrative embodiment, the federated metadata registry may be the metadata catalog 1604 of FIG. 16.

In a particular embodiment, maintaining the federated metadata registry includes, at 3304, identifying storage locations of all user data stored at the first shared storage system and storage locations of all user data stored at the one or more remote shared storage system in the federated metadata registry. In a particular embodiment, the data may be striped across multiple physical storage devices at the first shared storage system, at the one or more remote shared storage system, or at any combination thereof. For example, the federated metadata registry may include storage location information regarding the data striped across multiple independent storage systems of one or more storage area networks. In a particular embodiment, maintaining the federated metadata registry includes, at 3306, synchronizing the federated metadata registry with a remote federated metadata registry associated with the one or more remote shared storage systems. To illustrate, the federated metadata registry and the remote federated metadata registry may be synchronized through the shared storage systems or via a communication channel between two or more metadata controllers (e.g., an internet protocol communication channel).

The method may further include, at 3308, maintaining a federated service catalog. The federated service catalog may include storage location information to enable reconstruction of instructions to implement a plurality of services. For example, instructions to implement a first set of the plurality of services may be stored at the first shared storage system and instructions to implement a second set of the plurality of services may be stored at the one or more remote shared storage systems. In an illustrative embodiment, the federated service catalog may be a portion of the metadata catalog 1604 of FIG. 16.

The method may also include, at 3310, maintaining a federated infrastructure function catalog. The federated infrastructure function catalog may include data descriptive of storage location information to enable reconstruction of instructions to implement a plurality of infrastructure functions. For example, instructions to implement a first set of the plurality of infrastructure functions may be stored at the first shared storage system and instructions to implement a second set of the plurality of infrastructure functions may be stored at the one or more remote shared storage systems. In an illustrative embodiment, the federated infrastructure function catalog may be a portion of the metadata catalog 1604 of FIG. 16.

The method may also include, at 3312, receiving a request to access the federated metadata registry. In response to the request, the method may include, at 3314, filtering the federated metadata registry based on authentication information associated with a requesting device to generate a filtered federated metadata registry. The filtered federated metadata registry may not include storage location information regarding data that the requesting device is not authorized to access based on the authentication information. The method may also include, at 3316, sending the filtered federated metadata registry to the requesting device.

In a particular embodiment, one or more of the systems and methods disclosed herein, or portions thereof may be implemented using a set of instructions executable by one or more processors. For example, the servers, shared storage systems (including storage servers, storage area networks, physical storage devices and other hardware elements of the shared storage system), clients, security gateways, metadata controllers, and other elements may be implemented using one or more computer systems. A computer system refers to one or more computing devices or any collection of systems or subsystems that individually or jointly execute a set, or multiple sets, of instructions to perform one or more computer functions. An exemplary computer system may include at least one processor subsystem (also referred to as a central processing unit, or CPU). The CPU can be implemented using a single-chip processor or using multiple processors or processor cores. The CPU may retrieve instructions from a memory, control the reception and manipulation of input data, and the generation of output data. The CPU may also interact with other components or subsystems of the exemplary computer system or with other computing systems.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
providing a persistent common view of data, services, and infrastructure functions accessible via a plurality of shared storage systems of a virtual shared storage system, wherein the services accessible via the plurality of shared storage systems are stateless services;
applying different governance policies at two or more shared storage systems of the virtual shared storage system; and
transferring content from a particular shared storage system of the virtual shared storage system to a requesting device without using at least one of a server session, an application-to-server session, and an application session, wherein the content corresponds to at least one of data, a service, and an infrastructure function provided via the particular shared storage system, wherein, when the content transferred to the requesting device corresponds to a particular service provided via the particular shared storage system, the requesting device instantiates an instance of the particular service at the requesting device, wherein information associated with use of the particular service, a state of the particular service, and a security level of the particular service are not retained at the requesting device after the instance of the particular service is terminated, and wherein use of the particular service at the requesting device does not modify the particular service stored at the particular shared storage system.

2. The method of claim 1, wherein the virtual shared storage system includes at least a first shared storage system located at a first location and a second shared storage system located at a second location that is remote from first location.

3. The method of claim 1, further comprising transferring the content from the particular shared storage system to a second requesting device without using at least one of a second server session, a second application-to-server session, and a second application session, wherein the second requesting device instantiates a second instance of the particular service at the second requesting device, wherein second information associated with use of the particular service, a state of the particular service, and a security level of the particular service are not retained at the second requesting device after the second instance of the particular service is terminated.

4. The method of claim 3, wherein the instance of the particular service and the second instance of the particular service are instantiated concurrently.

5. The method of claim 1, wherein the particular service is one of a media streaming service, a collaboration application, an instant messaging application, and a communication application.

6. The method of claim 1, wherein the particular service is a media streaming service, the method further comprising:
receiving a request to access particular data stored at the particular shared storage system from the requesting device, wherein the particular data corresponds to media content stored at the particular shared storage system, wherein the request is generated by the instance of the particular service, and wherein the request is a request to stream the media content; and
transmitting the particular data to the requesting device.

7. The method of claim 1, further comprising modifying the particular service stored at the particular shared storage system while the instance of the particular service is instantiated at the requesting device, wherein use of the particular service by the requesting device is not affected by the modification of the particular service.

8. The method of claim 1, wherein the particular service is a subscription service.

9. A system comprising:
a control device communicatively coupled to a plurality of shared storage systems, wherein the control device is configured to:
provide a persistent common view of data, services, and infrastructure functions accessible via the plurality of shared storage systems, wherein the services accessible via the plurality of shared storage systems are stateless services;
apply different governance policies at two or more shared storage systems of the plurality of shared storage systems; and
transfer content from a first shared storage system of the plurality of shared storage systems to a requesting device without using at least one of a server session, an application-to-server session, and an application session, wherein the content corresponds to at least one of data, a service, and an infrastructure function provided via the first shared storage system, wherein, when the content transferred to the requesting device corresponds to a particular service provided via the particular shared storage system, the requesting device instantiates an instance of the particular service at the requesting device, wherein the particular service is one of a media streaming service, a collaboration application, an instant messaging application, and a communication application, and wherein information associated with use of the particular service, a state of the particular service, and a security level of the particular service are not retained at the requesting device after the instance of the particular service is terminated.

10. The system of claim 9, wherein a first governance policy applied to the first shared storage system includes one or more first policies associated with computer usage, data usage, access to the first shared storage system, data retention, malware scanning, or a combination thereof, and wherein the control device is further configured to determine, prior to transferring the content to the requesting device, whether the requesting device is authorized to access the first shared storage system based on the first governance policy.

11. The system of claim 10, wherein a second governance policy applied to a second shared storage system of the plurality of shared storage systems includes one or more second policies associated with computer usage, data usage, access to the second shared storage system, data retention, malware scanning, or any combination thereof, and wherein at least one of the one or more second policies is different than a corresponding policy of the one or more first policies.

12. The system of claim 11, wherein at least one of the second policies is the same as a corresponding policy of the one or more first policies.

13. The system of claim 9, wherein a first governance policy is associated with restricting access to the data, the services, and the infrastructure functions accessible via the plurality of shared storage systems and a second governance policy is associated with monitoring performance and availability of the data, the services, and the infrastructure functions accessible via the plurality of shared storage systems.

14. The system of claim 9, wherein the control device is one of a server and a metadata controller.

15. A non-transitory computer-readable storage medium comprising instructions that, when executed by a processor, cause the processor to:
provide a persistent common view of data, services, and infrastructure functions accessible via a plurality of shared storage systems of a virtual shared storage system, wherein the services accessible via the plurality of shared storage systems are stateless services;
apply different governance policies at two or more shared storage systems of the virtual shared storage system;
transfer content from a first shared storage system to a requesting device without using at least one of a server session, an application-to-server session, and an application session, wherein the content corresponds to at least one of data, a service, and an infrastructure function provided via the first shared storage system, wherein, when the content transferred to the requesting device corresponds to a particular service provided via the particular shared storage system, the requesting device instantiates an instance of the particular service at the requesting device, and wherein information associated with use of the particular service, a state of the particular service, and a security level of the particular service are not retained at the requesting device after the instance of the particular service is terminated; and
modify the particular service stored at the particular shared storage system while the instance of the particular service is instantiated at the requesting device, wherein use of the particular service by the requesting device is not affected by the modification of the particular service.

16. The non-transitory computer-readable medium of claim 15, wherein a first governance policy applied to the first shared storage system relates to one or more of computer usage, data usage, access to the first shared storage system, data retention, and malware scanning, the non-transitory computer-readable storage medium further comprising instructions that, when executed by the processor, cause the processor to:
determine, prior to transferring the content to the requesting device, whether the requesting device is authorized to access the first shared storage system based on the first governance policy,
wherein transferring the content from the first shared storage system to the requesting device comprises enabling the requesting device to read the content from one or more storage devices of the first shared storage system.

17. The non-transitory computer-readable medium of claim 16, wherein, when the requesting device is authorized to access the first shared storage system, the requesting device reads the content from the one or more storage devices of the first shared storage system without using protocol conversion.

18. The non-transitory computer-readable medium of claim 16, wherein the content is read in a written order by the requesting device from the one or more storage devices, wherein the written order is determined based on information stored at the first shared storage system, and wherein the information indicates one or more storage locations associated with one or more portions of the content and an order in which each of the one or more portions of the content was written to the one or more storage locations.

* * * * *